(12) United States Patent
Kim

(10) Patent No.: US 9,591,913 B2
(45) Date of Patent: Mar. 14, 2017

(54) PROTECTION CASE

(71) Applicant: Justin Chiwon Kim, Great Neck, NY (US)

(72) Inventor: Justin Chiwon Kim, Great Neck, NY (US)

(73) Assignee: JWIN ELECTRONICS CORP., Port Washington, NY (US)

(*) Notice: Subject to any disclaimer, the term of this patent is extended or adjusted under 35 U.S.C. 154(b) by 188 days.

(21) Appl. No.: 14/081,445

(22) Filed: Nov. 15, 2013

(65) Prior Publication Data

US 2015/0137731 A1    May 21, 2015

(51) Int. Cl.
| | | |
|---|---|---|
| *H01M 10/44* | (2006.01) | |
| *A45F 5/00* | (2006.01) | |
| *H02J 7/35* | (2006.01) | |
| *H02J 7/00* | (2006.01) | |
| *G04B 37/08* | (2006.01) | |
| *G04B 37/14* | (2006.01) | |

(52) U.S. Cl.
CPC .............. *A45F 5/00* (2013.01); *G04B 37/084* (2013.01); *G04B 37/1486* (2013.01); *H02J 7/0047* (2013.01); *H02J 7/0054* (2013.01); *H02J 7/355* (2013.01); *A45F 2005/002* (2013.01); *A45F 2005/008* (2013.01); *A45F 2200/0508* (2013.01); *A45F 2200/0516* (2013.01)

(58) Field of Classification Search
CPC ... Y02E 60/12; H01M 10/465; H01M 16/006; H02J 7/35; H02J 7/355

USPC .................................................. 320/110, 101
See application file for complete search history.

(56) References Cited

U.S. PATENT DOCUMENTS

| | | | | | |
|---|---|---|---|---|---|
| 4,106,279 | A | * | 8/1978 | Martin .................... | G04C 10/00 368/203 |
| 5,138,590 | A | * | 8/1992 | Masuda .................. | G04G 17/08 368/10 |
| 5,471,438 | A | * | 11/1995 | Kobayashi ............. | G04G 21/00 368/10 |
| 2003/0210149 | A1 | * | 11/2003 | Reisman ................ | G08B 21/22 340/573.4 |
| 2004/0057578 | A1 | * | 3/2004 | Brewer .................. | H04B 1/385 379/433.1 |
| 2005/0047282 | A1 | * | 3/2005 | Sakurazawa ........... | G04R 60/12 368/281 |
| 2009/0143117 | A1 | * | 6/2009 | Shin ....................... | H04B 1/385 455/575.6 |
| 2010/0112949 | A1 | * | 5/2010 | Kim ....................... | H01R 13/2421 455/41.3 |

* cited by examiner

*Primary Examiner* — Richard Isla Rodas
*Assistant Examiner* — Mohammed J Sharief
(74) *Attorney, Agent, or Firm* — Mintz Levin Cohn Ferris Glovsky and Popeo, P.C.; Kongsik Kim; Colleen H. Witherell

(57) ABSTRACT

A protection case for protecting a wearable electronic device includes: a protection case body that comprises first and second cases; and one or more coupling parts that are provided in the protection case body. The coupling parts couple the first and second cases to each other and couple the wearable electronic device while enclosing the wearable electronic device when the coupling parts are coupled to each other, and separate the first and second cases from each other and separate the wearable electronic device when the coupling parts are separated from each other.

9 Claims, 20 Drawing Sheets

PROTECTION CASE

TECHNICAL FIELD

The present disclosure relates to a protection case for protecting and waterproofing a wearable electronic device.

RELATED ART

In recent years, various electronic devices are provided to users, and portable electronic devices, such as portable terminals, MP3 players, Portable Multimedia Players (PMPs), and electronic books, that allows users to access various contents while the users carry them have been widely used.

Such a portable electronic device is specially processed through coating to protect an outer surface thereof from an external environment, but cannot be protected from everyday damages, foreign substances, and water.

Recently, a wearable electronic device put on the body or a wrist of a user or clothes has been developed.

Although the wearable electronic device can improve portability and prevent a danger of loss as it is put on the body or a wrist of a user, it may collide with another external object and may be easily damaged due to an impact while the user does not recognize the fact when the user moves with the wearable electronic device being put on the body of the user, and is always exposed to an external environment. Thus, water may be introduced into the wearable electronic device and the product may break.

The electronic device is mainly directed to voice communications or transmission or reception of SMS letters, but various additional functions (photographing of a picture or a video, various utilities, and games) are additionally mounted to the electronic device due to recent development of smart phones.

In this way, a high capacity battery pack is necessary to perform various functions without causing problems. That is, since the conventional wearable electronic device should be put on the body or a wrist of a user, it should be basically miniaturized and thus the battery pack also should be miniaturized.

Thus, electric power of the miniaturized battery pack provided in the wearable electronic device is exhausted quickly, in which case the battery pack should be recharged or a spare battery pack is used.

However, according to the conventional wearable electronic device, when the electric power of the battery pack and the spare battery pack are exhausted, another battery back should be mounted to the electronic device. Further, due to the limited battery capacity, a process of executing various functions is often inconvenient.

Further, in order to charge the battery pack and the spare battery pack, a charging device, a hands free jack, and charging holder always should be carried.

As a result, an apparatus that can protect and waterproof a wearable electronic device, and can supply charging electric power when being coupled to the wearable electronic device by using a rechargeable auxiliary battery pack and supply electric power to the wearable electronic device without using a separate auxiliary battery pack is required.

SUMMARY

Accordingly, an aspect of the present disclosure is to provide a protection case that includes a protection case body including an auxiliary battery cell to be coupled to a wearable electronic device while enclosing the wearable electronic device or separated from the wearable electronic device, thereby protecting and waterproofing the wearable electronic device in an improved way, simplifying the coupling and separation, facilitating supply of electric power to a product, and increasing in-use time of the product.

Another aspect of the present disclosure is to provide a protection case that enables a wearable electronic device to be introduced into or extracted from an opening formed at a lower portion of a protection case body as the wearable electronic device is slid through the opening, thereby protecting and waterproofing the wearable electronic device in an improved way and facilitating coupling and separation of the wearable electronic device, and includes a case electrically connected to the wearable electronic device and having an auxiliary battery cell attached to or detached from the opening therein, thereby facilitating supply of electric power to the product and increasing in-use time of the product.

Another aspect of the present disclosure is to provide a protection case that includes a protection case part coupled to a case body part while covering the case body part, thereby enabling a wearable electronic device to be coupled or separated more conveniently.

Another aspect of the present disclosure is to provide a protection case that includes a case body electrically connected to a wearable electronic device, and a wearing part including a solar cell module provided in the case body to generate electric power by using sunlight that supplies electric power to the wearable electronic device, thereby supplying electric power of the wearable electronic device without using a separate auxiliary battery cell, reducing manufacturing costs of the product, and miniaturizing the product.

Another aspect of the present disclosure is to provide a protection case that includes a protection case housing including a soft band housing and including a solar cell module for inserting the entire wearable electronic device into the band housing, thereby allowing the wearable electronic device to be put on the body of a user by using the protection case the entirety of which is soft, facilitating the wearing of the protection case, supplying electric power to the wearable electronic device without using a separate auxiliary battery cell, reducing manufacturing costs of the product, and miniaturizing the product.

Another aspect of the present disclosure is to provide a protection case that includes a soft rotatable case part including a solar cell module for opening and closing a protection case part the entirety of which is soft as the rotatable case part is rotated, thereby enabling a wearable electronic device to be mounted or separated after the rotatable case part is rotated to open or close the protection case part so that the wearable electronic device can be simply mounted to or separated from the protection case part, and includes first and second magnet coupling parts that are attached to or separated from opposite ends of the protection case part by using a magnetic force, thereby further enabling the protection case part to be put on the body of a user more conveniently.

In accordance with a first aspect of the present invention, there is provided a protection case for protecting a wearable electronic device, the protection case including: a protection case body that comprises first and second cases; and one or more coupling parts that are provided in the protection case body, wherein the coupling parts couple the first and second cases to each other and couple the wearable electronic device while enclosing the wearable electronic device when the coupling parts are coupled to each other, and separate the first and second cases from each other and separate the wearable electronic device when the coupling parts are separated from each other.

In accordance with a second aspect of the present invention, there is provided a protection case for protecting a wearable electronic device, the protection case including: a protection case body that has an opening at a lower portion thereof such that the wearable electronic device is introduced or extracted as the wearable electronic device is slid through the opening; a case that is electrically connected to the wearable electronic device and supplies electric power and in which an auxiliary battery cell attached to or detached from the opening is embedded; and a wearing part that is provided between the protection case body and the case.

In accordance with a third aspect of the present invention, there is provided a protection case for protecting a wearable electronic device, the protection case including: a case body in which an auxiliary battery cell electrically connected to the wearable electronic device and configured to supply electric power to the wearable electronic device is embedded; a protection case that is coupled to the case body while covering the case body or separated from the case body; and a wearing part that is provided in the case body.

In accordance with a fourth aspect of the present invention, there is provided a protection case for protecting a wearable electronic device, the protection case including: a protection case body that has a transparent cover part on a front surface thereof and a rear surface of which is opened, the protection case body being coupled and electrically connected to the wearable electronic device; a cover that opens and closes the rear surface of the protection case body as the cover is attached to or detached from the protection case body; and a solar cell module that is provided in the protection case body to supply electric power to the wearable electronic device.

In accordance with a fifth aspect of the present invention, there is provided a protection case for protecting a wearable electronic device, the protection case including: a protection case housing an entirety of which forms a soft band housing and that has a solar cell module into which the entire wearable electronic device is inserted in the band housing; and a connector that is provided in the protection case housing to electrically connect the solar cell module and the wearable electronic device to each other and to supply electric power of the solar cell module to the wearable electronic device.

In accordance with a sixth aspect of the present invention, there is provided a protection case for protecting a wearable electronic device, the protection case including: a protection case part an entirety of which is soft; a soft rotatable case part comprising a solar cell module rotatably provided in the protection case part; and first and second magnet coupling parts that are provided at opposite ends of the protection case part to attach or separate opposite ends of the protection case part, wherein the protection case part mounts or separates the wearable electronic device as the protection case part is opened or closed according to rotation of the rotatable case part, and supplies electric power of the solar cell module to the wearable electronic device.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Hereinafter, protection cases according to various embodiments of the present disclosure will be described with reference to the accompanying drawings.

In particular, general terms that are currently widely used are selected as the terms used in the embodiments of the present disclosure, considering functions of the terms in the embodiments of the present disclosure, but the meanings of the terms may become different according to intentions of the technicians of the art, judicial precedents, or advent of new technologies. Further, in some cases, the terms are arbitrarily selected by the applicant, in which case the meanings of the terms will be described in detail in the description of the embodiments of the present disclosure. Thus, the terms used in the embodiments of the present disclosure should be defined based on the meanings of the terms and the overall contents of the embodiments of the present disclosure instead of simple titles of the terms.

When a certain part includes a certain element in the embodiments of the present disclosure, the part does not exclude another element but may further include another element as long as there is not a specially contrary description. Further, the terms such as "unit" and "module" refers to a unit for processing at least one function or operation, and may be realized by hardware, software, or a combination of hardware and software.

Here, the wearable electronic device 1a according to the embodiments of the present disclosure may be a portable terminal that may be put on the body of a user or a watch type portable terminal.

The embodiments of the present disclosure may be applied to other electronic devices 1a instead of the wearable electronic device 1a. For example, Here, applications of the electronic device according to the embodiments of the present disclosure may include all information communication devices, multimedia devices, and application devices thereof such as portable multimedia players (PMPs), MP3 players, navigation devices, gaming devices, notebooks, net books, advertising panels, TVs, digital broadcasting players, personal digital assistants (PDAs), and smart phones, including all mobile communication terminals operated based on communication protocols corresponding to various communication systems.

Here, first, among the embodiments of the present disclosure, a protection case of a wearable electronic device according to a first embodiment of the present disclosure will be described.

Figure 1:
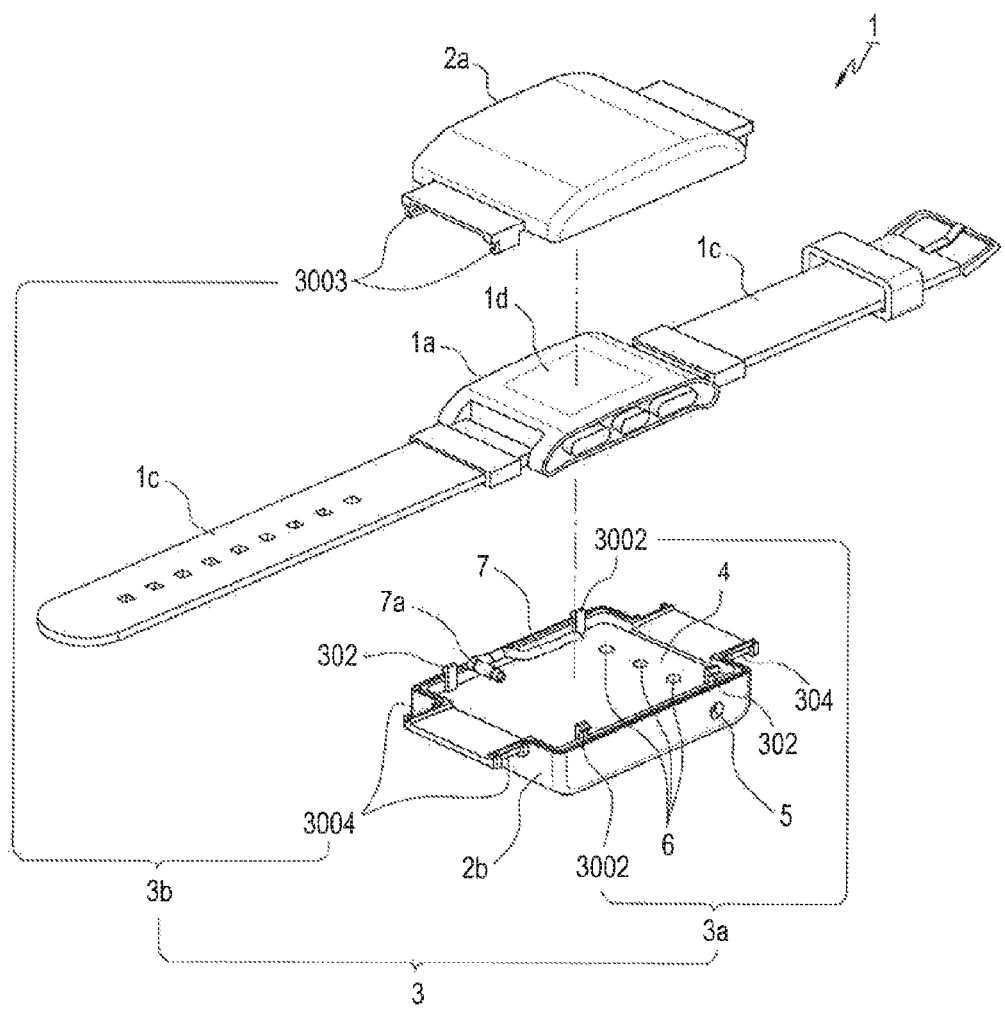
FIG. 1 is an exploded perspective view illustrating a configuration of a protection case according to a first embodiment of the present disclosure.
Figure 2:
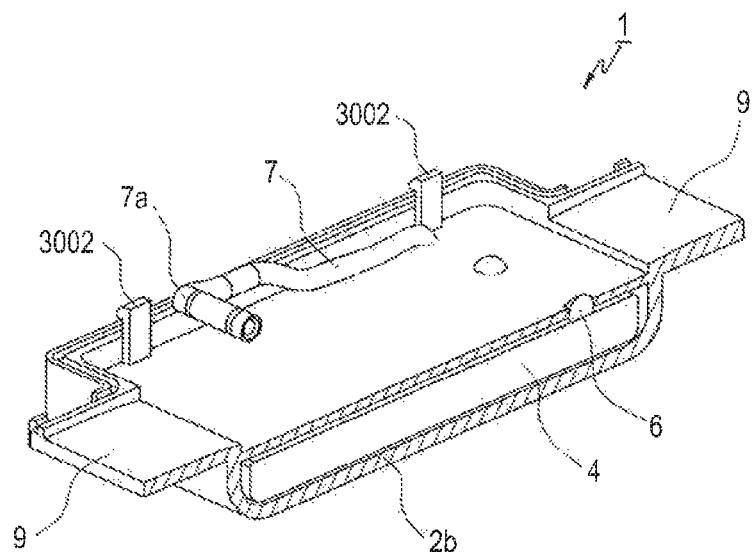
FIG. 2 is a cutaway perspective view illustrating a second case of the protection case according to the first embodiment of the present disclosure.

FIG. 1 is an exploded perspective view illustrating a configuration of a protection case according to a first embodiment of the present disclosure. FIG. 2 is a cutaway perspective view illustrating a second case of the protection case according to the first embodiment of the present disclosure.

Referring to FIGS. 1 and 2, the protection case 1 includes a protection case body 2 including first and second cases 2a and 2b, and one or more coupling parts 3. The coupling parts 3 couple the first and second cases 2a and 2b and enclose the wearable electronic device 1a when the coupling parts 3 are coupled to each other, and allow the first and second cases 2a and 2b to be separated from each other and the wearable electronic device 1a to be removed when the coupling parts 3 are separated from each other.

In this way, since the coupling parts 3 allow the protection case body 2 to be coupled to the wearable electronic device 1a while enclosing the wearable electronic device 1a or separated from the wearable electronic device 1a, the wearable electronic device 1a can be protected and further waterproofed.

As illustrated in FIG. 1, the first case 2a is formed of a transparent material to face a display 1d provided in the wearable electronic device 1a, and the transparent material may be any one of polycarbonate, polyethylene, and acryl. Although it exemplified that the first case 2a is formed of the disclosed transparent material, the present disclosure is not limited thereto. The first case 2a may be formed of another transparent material so that the display 1d of the wearable electronic device 1a can be viewed from the outside, the first case 2a facing the display 1d of the wearable electronic device 1a.

In particular, the display 1d of the wearable electronic device 1a may be a capacitive touch panel. The display 1d may be not only a capacitive touch panel but also other types of touch panels through which a screen can be touched for an input (for example, a resistive touch panel, an optical touch panel, an ultrasonic touch panel, and the like).

As illustrated in FIG. 1, the second case 2b includes an auxiliary battery cell 4, a charging terminal penetrating part 5, and first and second power terminals 6 and 7. The auxiliary battery cell 4 may be embedded in the second case 2b to be electrically connected to the wearable electronic device 1a and to supply electric power. The charging terminal penetrating part 5 is formed on a side surface of the second case 2b such that an external charging terminal (not illustrated) can pass through the charging terminal penetrating part 5 to be electrically connected to the auxiliary battery cell 4.

In this way, the second case 2b including the auxiliary battery cell 4 facilitates supply of electric power to the wearable electronic device 1a to increase in-use time.

Figure 3:
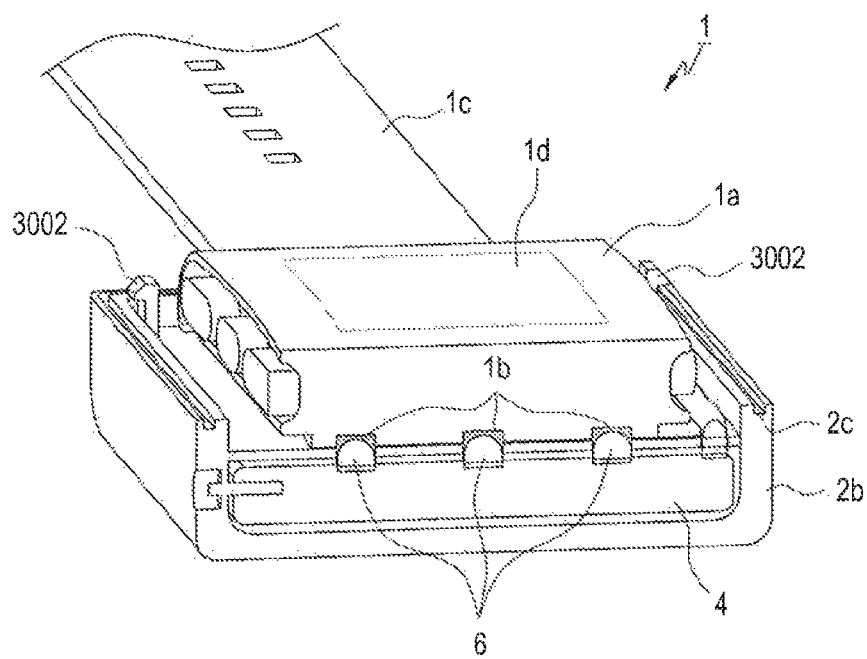
FIG. 3 is a cutaway perspective view illustrating a state in which a wearable electronic device according to the first embodiment of the present disclosure is coupled to the second case of the protection case.

As illustrated in FIGS. 2 and 3, in order that the auxiliary battery cell 4 can supply electric power to the wearable electronic device 1a, the first and second power terminals 6 and 7 are provided in the second case 2b to be electrically connected to a connection terminal 1b provided in the wearable electronic device 1a. The first power terminal 6 may include one or more power connection terminals 1b to be electrically connected to the power connection terminals 1b provided in the wearable electronic device 1a. The second power terminal 7 may include a power cable including a power connector 7a provided in the wearable electronic device 1a to be electrically connected to the power connector 7a.

Figure 4:
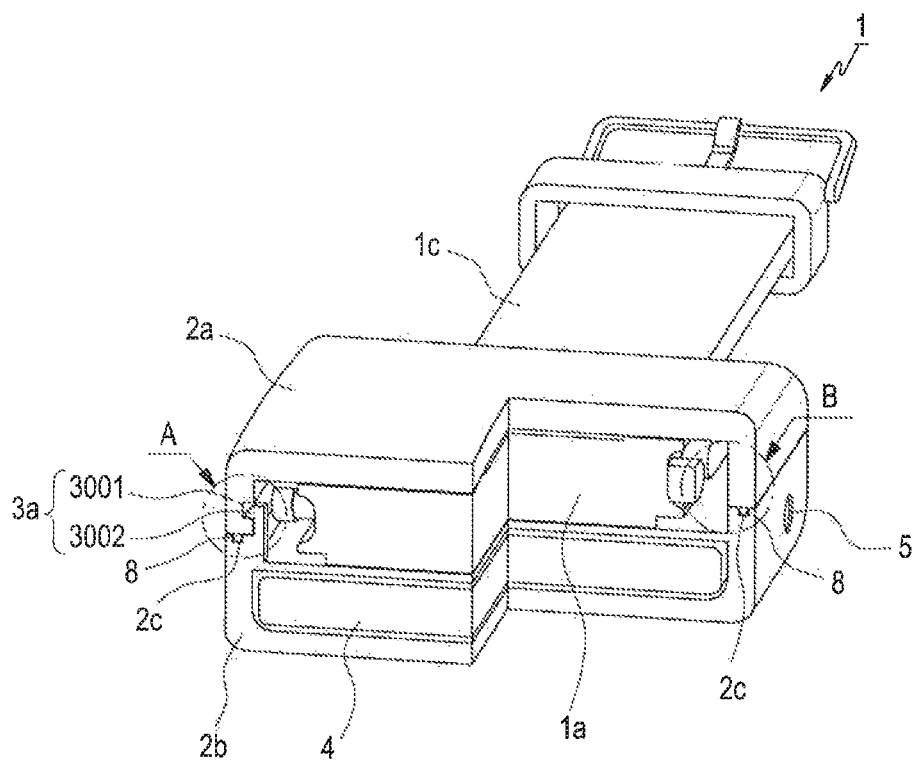
FIG. 4 is a cutaway perspective view illustrating a coupled state of the protection case according to the first embodiment of the present disclosure.
Figure 5:
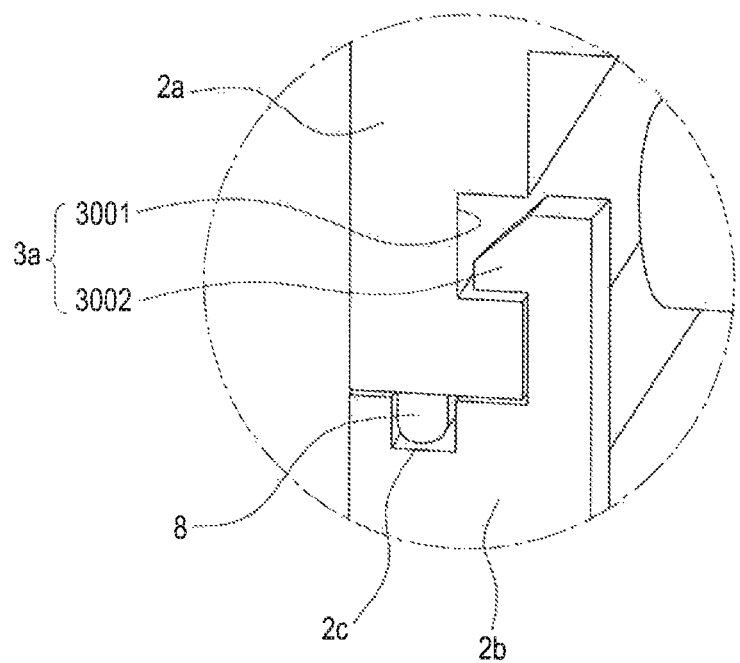
FIG. 5 is an enlarged cutaway perspective view of part A of FIG. 4.

As illustrated in FIGS. 1, 4 and 5, the coupling parts 3 may include first and second coupling parts 3a,b, and the first coupling part 3a includes one or more coupling recesses 3001 and one or more coupling hooks 3002. The coupling recesses 3001 are provided at an inner circumference of the first case 2a to be attached to or detached from the coupling hooks 3002. The coupling hooks 3002 are provided at an inner circumference of the second case 2b to be attached to or detached from the coupling recesses 3001 so that the first and second cases 2a and 2b can be separated from or coupled to each other.

Figure 7:
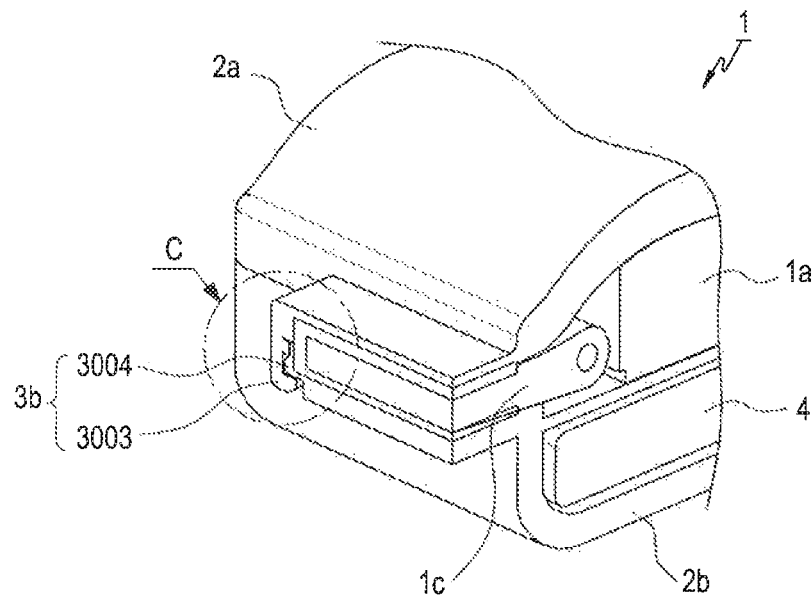
FIG. 7 is a perspective view illustrating a coupled state of first and second coupling parts of the protection case according to the first embodiment of the present disclosure.
Figure 8:
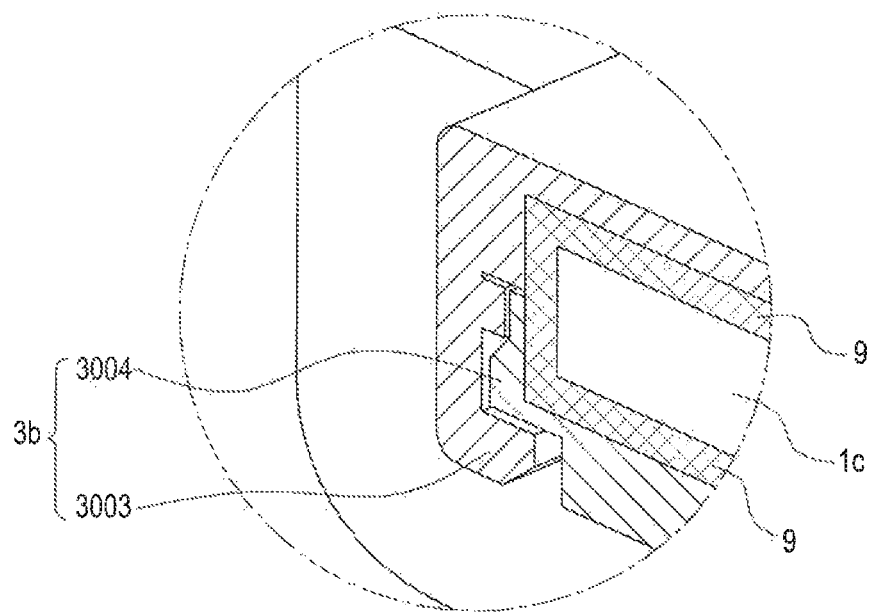
FIG. 8 is an enlarged perspective view of part C of FIG. 7.

As illustrated in FIGS. 7 and 8, the second coupling part 3b includes stopping portions 3003 and catching portions 3004. The stopping portions 3003 are provided at opposite ends of the first case 2a to be attached to or detached from the catching portion 3004. The catching portions 3004 are provided at opposite ends of the second case 2b to be attached to or detached from the stopping portions 3003 so that the first and second cases 2a and 2b can be separated from or coupled to each other.

Figure 6:
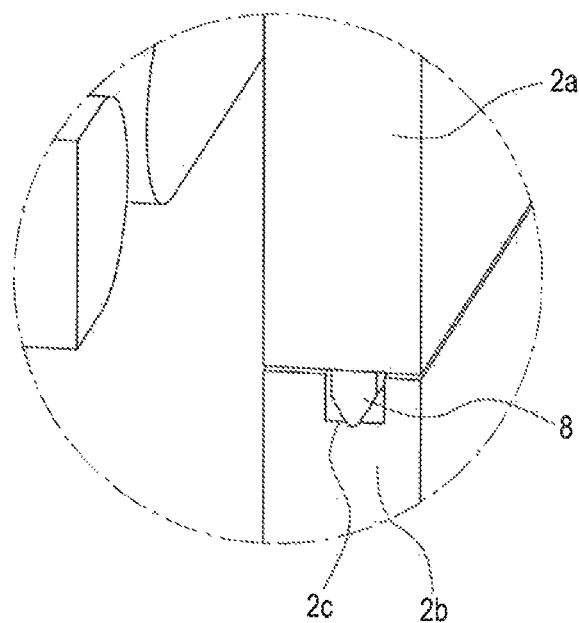
FIG. 6 is an enlarged cutaway perspective view of part B of FIG. 4.

As illustrated in FIG. 6, the first case 2a may include a case waterproof member 8 that may be inserted into a waterproof recess 2c formed in the second case 2b.

As illustrated in FIG. 8, the second coupling part 3b is separated from or coupled to a band 1c provided in the wearable electronic device 1a. That is, the second coupling part 3b is coupled to the band 1c while enclosing upper and lower surfaces of the band 1c. A band waterproof member 9 is provided in the second coupling part 3b to block external water introduced into the second coupling part 3b. That is, the band waterproof member 9 is pressed and attached to the band 1c to block external water when the second coupling part 3 is coupled to the band 1c. The band waterproof member 9 may be formed of a soft material.

Here, the soft material may include at least one of rubber and polyurethane. In particular, the soft material may be other types of urethane and silicon other than rubber and polyurethane.

Hereinafter, a watch type portable terminal will be exemplified as an application of the wearable electronic device 1a.

FIG. 3 is a cutaway perspective view illustrating a state in which a wearable electronic device 1a according to the first embodiment of the present disclosure is coupled to the second case 2b of the protection case. FIG. 4 is a cutaway perspective view illustrating a coupled state of the protection case according to the first embodiment of the present disclosure.

First, as illustrated in FIG. 1, since the protection case body 2 includes the first and second cases 2a and 2b, the watch type portable terminal 1a is placed on an upper surface of the second case 2b. Then, as illustrated in FIGS. 2 and 3, the connection terminal 1b provided in the watch type portable terminal 1a is electrically connected to the one or more first power terminals 6 provided on an upper surface of the second case 2b. In this state, the second power terminal 7 provided in the second case 2b is electrically connected to a connector connection terminal (not illustrated) provided in the watch type portable terminal 1a. Then, since the second power terminal 7 includes a power cable including a connector 7a, the connector 7a is fitted with the connector terminal 1b and the second case 2b and the watch type portable terminal 1a are electrically connected to each other at the same time.

As illustrated in FIG. 4, the first case 2a is coupled to an upper portion of the second case 2b coupled to the watch type portable terminal 1a. That is, the first and second cases 2a and 2b are coupled to each other to enclose the watch type portable terminal 1a. Then, the one or more coupling recesses 3001 provided at an inner circumference of the first case 2a are coupled to the one or more coupling hooks 3002 formed in the second case 2b and are stopped by the coupling hooks 3002 to be fixed at the same time.

At the same time, as illustrated in FIGS. 7 and 8, the stopping portions 3003 provided at opposite ends of the first case 2a are fitted with and coupled to the catching portions 3004 provided at opposite ends of the second case 2b and are engaged with the catching portions 3004 to be fixed at the same time. The first and second cases 2a and 2b are waterproofed by coupling the first and second cases 2a and 2b and inserting the case waterproof member 8 provided in the first case 2a into the water proof recess 2c formed in the second case 2b at the same time.

As illustrated in FIG. 8, since the band waterproof member 9 coupled to the band 1c provided in the watch type portable terminal 1a while waterproofing the band 1c is provided in the second coupling part 3b, the second coupling part 3b is engaged with the band 1c when the first and second cases 2a and 2b are coupled to each other and the band waterproof member 9 is coupled to the band 1c to interrupt external water from being introduced into the band 1c.

Thus, in the embodiment, protection and waterproof functions of the watch type portable terminal can be further improved by the protection case body including an auxiliary battery cell, which is coupled to the watch type portable terminal while enclosing the watch type portable terminal and is separated from the watch type portable terminal, and an in-use time of the product can be increased by facilitating supply of electric power to the product.

Hereinafter, a protection case of a wearable electronic device according to a second embodiment of the present disclosure will be described with reference to the accompanying drawings.

Figure 9:
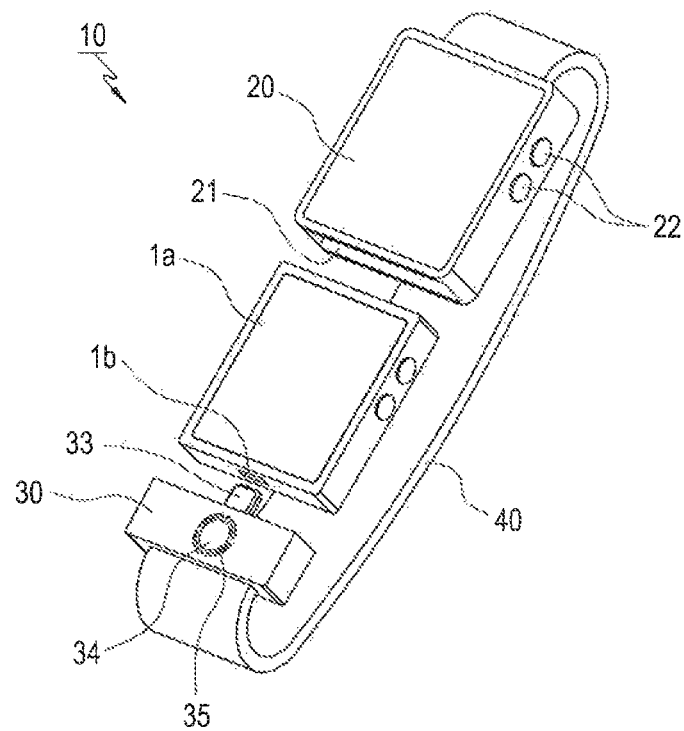
FIG. 9 is an exploded perspective view illustrating a configuration of a protection case according to a second embodiment of the present disclosure.
Figure 10:
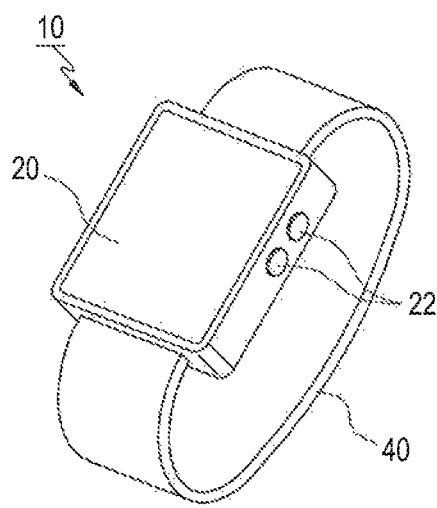
FIG. 10 is a perspective view illustrating a state before an operation of the protection case according to the second embodiment of the present disclosure.
Figure 11:
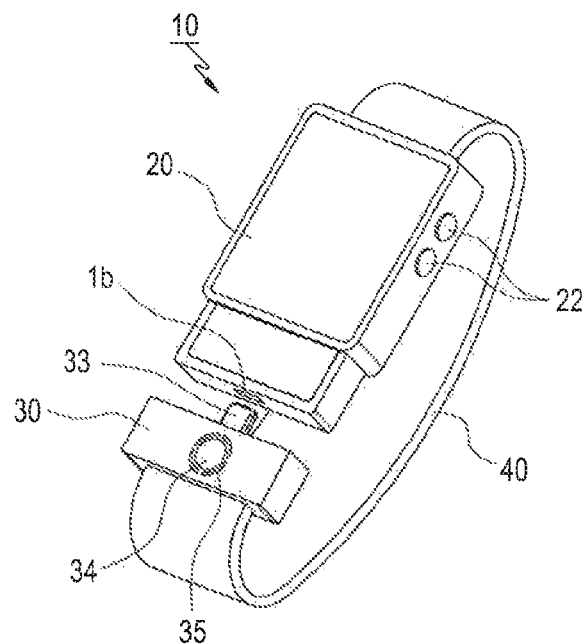
FIG. 11 is a perspective view illustrating an operation of the protection case according to the second embodiment of the present disclosure.

FIG. 9 is an exploded perspective view illustrating a configuration of a protection case according to a second embodiment of the present disclosure. FIG. 10 is a perspective view illustrating a state before an operation of the protection case according to the second embodiment of the present disclosure. FIG. 11 is a perspective view illustrating an operation of the protection case according to the second embodiment of the present disclosure.

Referring to FIGS. 9 to 11, the protection case 10 includes a protection case body 20, a case 30 in which an auxiliary battery cell 40 (see FIG. 12) is embedded, and a wearing part 40. An opening 21 is formed at a lower portion of the protection case body 20 so that the case 30 can be introduced or extracted through the opening 21. As the wearable electronic device 1a is slid, the protection case body 20 can be introduced or extracted through the opening 21 to be coupled to or separated from the wearable electronic device 1a at the same time. The case 30 is electrically connected to the wearable electronic device 1a and supplies electric power charged in the auxiliary battery cell 40 to the wearable electronic device 1a. The case 30 may be attached to or detached from an entrance of the opening 21.

The wearing part 40 is provided at one end of the protection case body 20 and one end of the case 30 to be put on the body of a user. That is, one end of the wearing part 40 is provided in the protection case body 20 and an opposite end of the wearing part 40 is provided in the case 30.

In this way, since the protection case body 20 is introduced or extracted as the wearable electronic device 1a is slid, and the case 30 is electrically connected to the wearable electronic device 1a provided in the protection case body 20 and supplies electric power charged in the auxiliary battery cell 40, electric power can be easily supplied to the wearable electronic device 1a and use of the wearable electronic device 1a can be improved. Further, the wearable electronic device 1a can be simply coupled to or separated from the protection case.

One or more buttons 22 are provided in the protection case body 20 so that a button of the wearable electronic device 1a can be pressed as the button 22 is pressed while the wearable electronic device 1a is coupled to the protection case body 20.

The case 30 will be described in more detail with reference to FIGS. 9 and 10. The case 30 includes an auxiliary battery cell 40 (see FIG. 12), a connector 33, a power switch, and one or more charging lamps 35. The auxiliary battery cell 400 is provided in the case 30 such that the connector is electrically connected to a terminal provided in the wearable electronic device 1a when the wearable electronic device 1a is coupled to the case 30 and supports charging electric power to the wearable electronic device 1a. The connector 33 is provided in the case 30 to be electrically connected to the terminal provided in the wearable electronic device 1a. The power switch 34 is provided in the case to operate a battery level and a charging state of the auxiliary battery cell 40 as the power switch 34 is pressed. The charging lamps 35 are provided at an outer circumference of the power switch 340 to display the battery level and the charging state of the auxiliary battery cell 40 (see FIG. 12).

The case 30 may include a cover for opening and closing the opening 21 formed at a lower portion of the protection case body 20.

That is, the case 30 is coupled to the opening 21 and is closed after the wearable electronic device 1a is slid through the opening 21 of the protection case body 20. Further, if the case 30 is separated from the opening 21 to open the opening 21, the wearable electronic device 1a can be separated from the protection case body 20 through the opened opening 21.

Hereinafter, a method of charging the charging lamp 35 will be described in detail.

Figure 12:
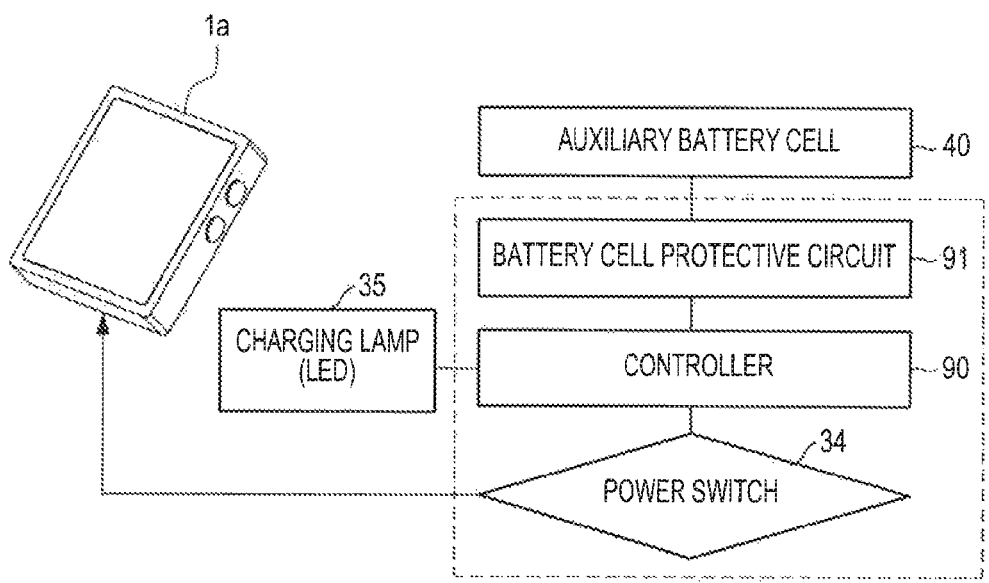
FIG. 12 is a circuit diagram illustrating a method of charging the protection case according to the second embodiment of the present disclosure.

FIG. 12 is a circuit diagram illustrating a method of charging the protection case according to the second embodiment of the present disclosure.

As illustrated in FIG. 12, the charging lamp may include an LED. The charging lamp may include other types of charging lamps that can display a battery level and a charging state of the auxiliary battery cell instead of an LED. For example, it may include a small-sized bulb and a small-sized lamp.

The power switch 34 is O-shaped, and four charging lamps 35 are provided at an outer circumference of the power switch 34.

A battery cell protection circuit 91 prevents the auxiliary battery cell 40 from emitting heat or being fractured due to over-charging, over-discharging, and an over-current. For example, when an abnormal voltage or an abnormal current is detected, the battery cell protection circuit 91 can stop charging or discharging of the auxiliary battery cell.

A controller 90 can detect attachment/detachment of the auxiliary battery cell 40. The controller may switch on or off a power source of the case 30 based on a signal input from the power switch 34. The switching on or off of the power source of the case 30 may be controlled based on a length of a signal received from the power switch 34. The controller may control charging of the battery cell (not shown) and the auxiliary battery cell 40 provided in the electronic device 1a according to an on or off state of the case 30 in a state in which the auxiliary battery cell 40 is coupled.

For example, an external charging terminal (not illustrated) and a terminal (not illustrated) of the case 30 are electrically connected to each other, and when a signal is input from the power switch for 3 seconds in a state in which a power source of the case 30 is switched off, the controller can switch on the power source of the case. Further, the controller 90 performs a control to charge a battery cell (not illustrated) provided in the electronic device 1a by using electric power input from an external charging terminal (not illustrated). If the battery cell (not illustrated) provided in the electronic device 1a is completely charged, the controller performs a control to charge the auxiliary battery cell 40 provided in the case 30.

In contrast, when a signal is input from the power switch for 3 seconds in a state in which a power source of the case 30 is switched on, the controller can switch off the power source of the case. Further, the controller performs a control to charge a battery cell (not illustrated) provided in the electronic device 1a by using electric power input from an external charging terminal (not illustrated). Then, the auxiliary battery cell 40 provided in the case 30 is not charged.

The controller 90 may control light emission of the charging lamp according to a charging and discharging state. The light emission of the charging lamp may be controlled based on a length of a signal received from the power switch 34.

For example, when a signal is input for a short time period (for example, for more than 1 second and less than 3 seconds) from the power switch 34, the controller 90 may control light emission of the charging lamp to display a battery level of the auxiliary battery cell.

That is, if the power switch is pressed for a long time (for example, for not less than 3 seconds), the power source of the case is switched on or off, and if the power switch is pressed for a short time (for example, for more than 1 second and less than 3 seconds), a battery level of the auxiliary battery cell 40 is displayed. If a user presses the power switch 34 for a long time, the power source of the case is switched on, and if the user presses the power switch 34 for a long time again, the power source of the case is switched off.

Thus, if the power switch is pressed for a long time to switch off the power source of the case while the external charging terminal (not illustrated) is electrically connected to a terminal (not illustrated) of the case 30, the power source of the external charging terminal (not illustrated) charges only the battery cell (not illustrated) provided in the electronic device 1a. Then, if the power switch is pressed for a long time to switch on the power source of the case again, the power source of the external charging terminal (not illustrated) charges the battery cell (not illustrated) provided in the electronic device 1a and then charges the auxiliary battery cell 40 provided in the case.

Figure 13A:
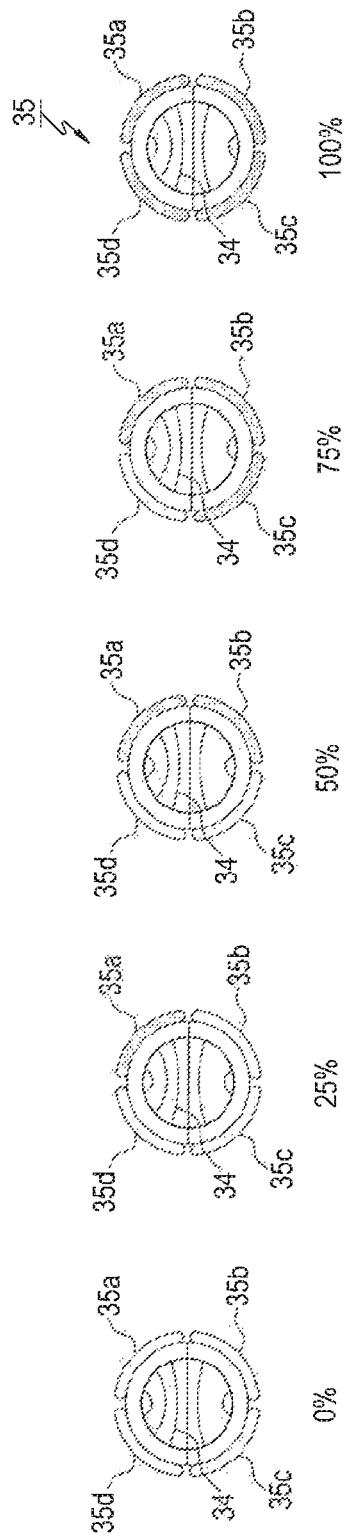
FIG. 13A is a view illustrating a process of charging a charging lamp of the protection case according to the second embodiment of the present disclosure.
Figure 13B:
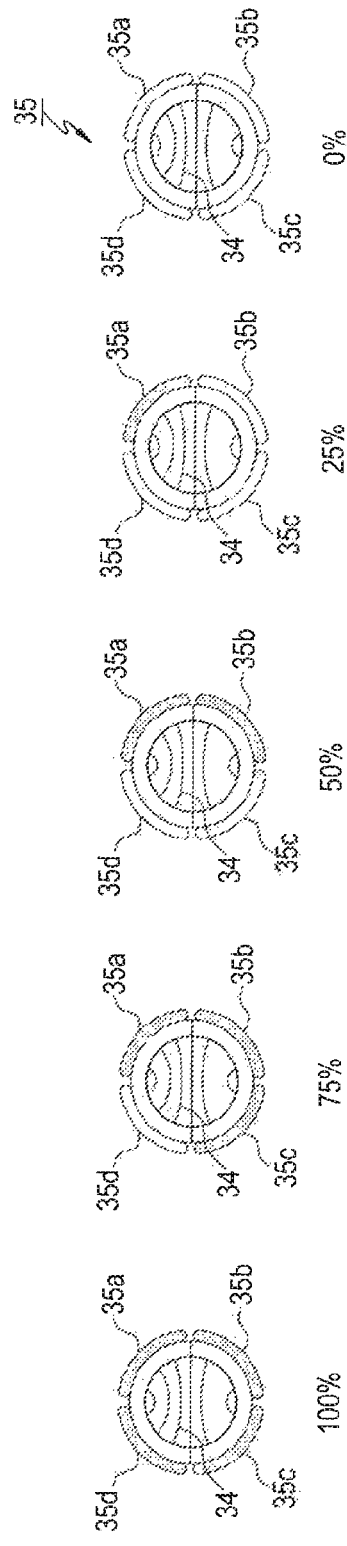
FIG. 13B is a view illustrating an in-use state of the charging lamp of the protection case according to the second embodiment of the present disclosure.

Hereinafter, a charging state and an in-use state of the charging lamp will be described. FIG. 13A is a view illustrating a process of charging a charging lamp of the protection case according to the second embodiment of the present disclosure. FIG. 13B is a view illustrating an in-use state of the charging lamp of the protection case according to the second embodiment of the present disclosure.

As illustrated in FIG. 13A, the four charging lamps 35a, 35b, 35c, and 35d sequentially emit light clockwise to display a battery level of the auxiliary battery cell 40. That is, when the battery level of the auxiliary battery cell 40 is 0%, the charging lamps 35 do not emit light. When the battery level of the auxiliary battery cell 40 is 25%, the first charging lamp 35a emits light. When the battery levels of the auxiliary battery cell 40 are 50% and 70%, the second charging lamp 35b emits light and then the third charging lamp 35c sequentially emits light. Finally, when the battery level of the auxiliary battery cell 40 is 100%, the fourth charging lamp 35d emits light and all the four charging lamps 35a, 35b, 35c, and 35d emit light. Thus, it can be informed that the auxiliary battery cell is completely charged.

The controller 90 may perform a control to supply electric power from the auxiliary battery cell 40 to the electronic device 1a. The electronic device 1a may perform various functions by using electric power supplied from the auxiliary battery cell 40.

Meanwhile, as illustrated in FIG. 13B, in the state in which all the first to fourth charging lamps 35a, 35b, 35c, and 35d emit light, the charging lamps 35a, 35b, 35c, and 35d are sequentially switched off in a counterclockwise direction as the auxiliary battery cell 40 is discharged.

First, when the battery level of the auxiliary battery cell 40 is 75%, the fourth charging lamp 35d is switched off. When the battery levels of the auxiliary battery cell 40 are 50% and 25%, the second and third charging lamps 35b and 35c are sequentially switched off. Finally, if the battery level of the auxiliary battery cell 40 is 0%, the first charging lamp 35a is switched off so that all the charging lamps 35a, 35b, 35c, and 35d are switched off. When the battery level of the auxiliary battery cell 40 decreases to a predetermined level, for example, not more than 10%, the charging lamps 35a, 35b, 35c, and 35d may be flickered to inform that the auxiliary battery cell 40 needs to be recharged.

The light emission of the charging lamps 35 that has been described with reference to FIGS. 13A and 13B may be controlled by the controller 90.

Hereinafter, another example of the protection case body and the case of the protection case according to the second embodiment of the present disclosure will be described with reference to the accompanying drawings.

Figure 14A:
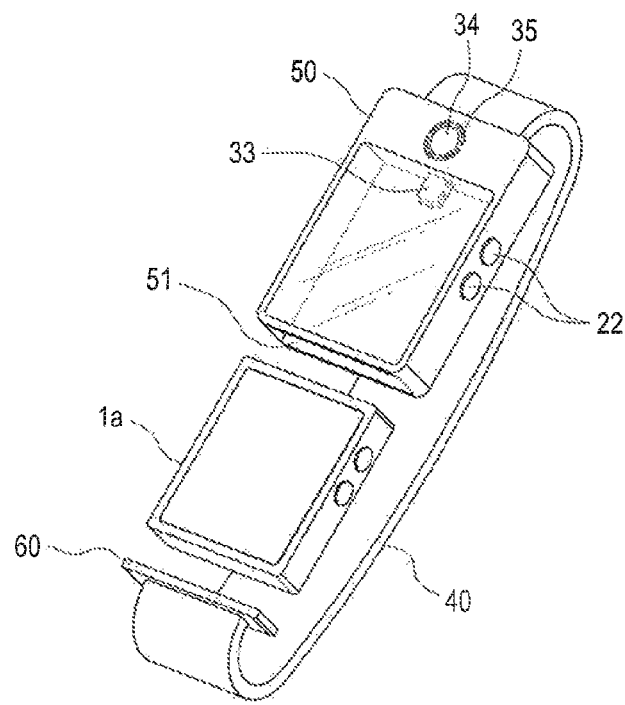
FIG. 14A is an exploded perspective view illustrating another example of the protection case according to the second embodiment of the present disclosure.
Figure 14B:
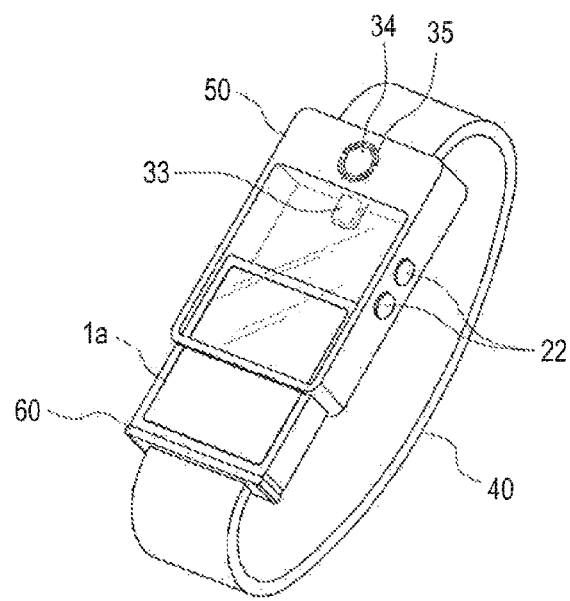
FIG. 14B is a perspective view illustrating an operation of another example of the protection case according to the second embodiment of the present disclosure.

FIG. 14A is an exploded perspective view illustrating another example of the protection case according to the second embodiment of the present disclosure. FIG. 14B is a perspective view illustrating an operation of another example of the protection case according to the second embodiment of the present disclosure.

Referring to FIGS. 14A and 14B, the protection case body 50 may include an auxiliary battery cell 40, a connector 33, a power switch 34, and charging lamps 35.

That is, the battery cell 40, the connector 33, the power switch 34, and the charging lamps 35 are not provided in the case 80 but are provided in the protection case body 50. The case 80 performs a cover function for opening or closing an opening 51 formed in the protection case body 50 as the case 80 is attached to or detached from the opening 51.

The connector 33 is provided within the case body 50 such that the connector 33 is inserted into the wearable electronic device 1a to be electrically connected to a terminal provided in the wearable electronic device 1a as the wearable electronic device 1a is slid into the opening 51 of the protection case body 50.

As illustrated in FIG. 14B, the wearable electronic device 1a is slid through and coupled to the opening 51 of the protection case body 50, in which case a terminal of the wearable electronic device 1a is electrically connected to the connector 33 provided within the protection case body 50 and receives electric power of the auxiliary battery cell 40 embedded in the protection case body 50.

In this state, the case 60 is coupled to the opening 51 of the protection case body 50 to close the opening 51 of the protection case body 50.

Then, if the case 60 is separated from the opening 51 of the protection case body 50 to open the opening 51, the wearable electronic device 1a is slid and separated from the protection case body 50 through the opened opening 51.

Thus, the protection case body 50 includes all of the battery cell 40, the connector 33, the power switch 34, and the charging lamps 35, and the case 60 is used for a cover function to improve assembly of the protection case.

Here, a method of charging the charging lamps 35 has been described in the second embodiment of the present disclosure and will be omitted.

Hereinafter, another example of the protection case body and the case of the protection case of the second embodiment of the present disclosure will be described with reference to the accompanying drawings.

Figure 15A:
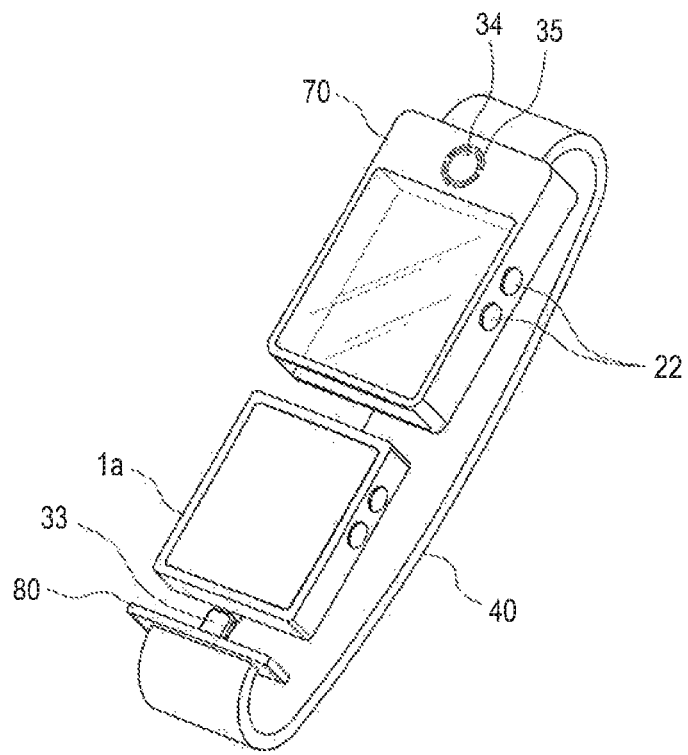
FIG. 15A is an exploded perspective view illustrating another example of the protection case according to the second embodiment of the present disclosure.
Figure 15B:
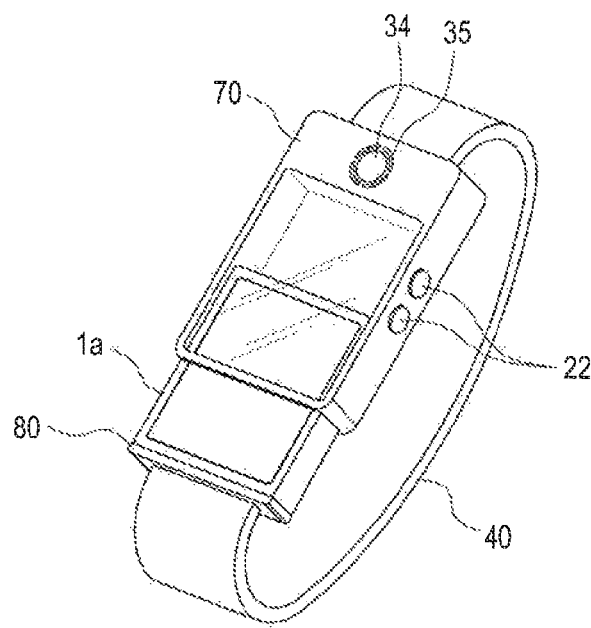
FIG. 15B is a perspective view illustrating an operation process of another example of the protection case according to the second embodiment of the present disclosure.

FIG. 15A is an exploded perspective view illustrating another example of the protection case according to the second embodiment of the present disclosure. FIG. 15B is a perspective view illustrating an operation process of another example of the protection case according to the second embodiment of the present disclosure.

Referring to FIGS. 15A and 15B, the protection case body 70 may include an auxiliary battery cell 40, a power switch 34, and charging lamps 35, and the case 80 may include a connector 33.

That is, the battery cell 40, the power switch 34, and the charging lamps are not provided in the case 80 but are provided in the protection case body 70. The case 80 is attached to or detached from an opening formed in the protection case body 70 to open or close the opening 71.

The connector 33 provided in the case 80 is electrically connected to a terminal provided in the wearable electronic device 1a.

As illustrated in FIG. 15B, the terminal of the wearable electronic device 1a is electrically connected to the connector 33 provided in the case 80. In this state, the wearable electronic device 1a is slid through and coupled to the opening 71 provided in the protection case body 70, and the case 80 is coupled to the opening 71 of the protection case 70 to close the opening 71.

Then, a terminal (not illustrated) of the wearable electronic device 1a is coupled and electrically connected to a connection terminal (not illustrated) of the protection case body to receive electric power of the auxiliary battery cell 40 embedded in the protection case body 70.

If the case 80 is separated from the opening 71 of the protection case body 70 again, the case 80 opens the opening 71 and slides the wearable electronic device 1a to separate the wearable electronic device 1a from the protection case body 70.

That is, the case 80 and the wearable electronic device 1a are separated from the opening 71 while being electrically connected to each other. Then, the opening 71 is opened.

Thus, since the protection case body 70 includes the battery cell 40, the power switch 34, and the charging lamps 35 and the case 80 includes the connector 33, components can be easily assembled in the protection case body 70 and electrical connections between components can be improved.

Similarly, a method of charging the charging lamps 35 has been described in the second embodiment of the present disclosure and will be omitted.

Hereinafter, a protection case according to a third embodiment of the present disclosure will be described with reference to the accompanying drawings.

Figure 16A:
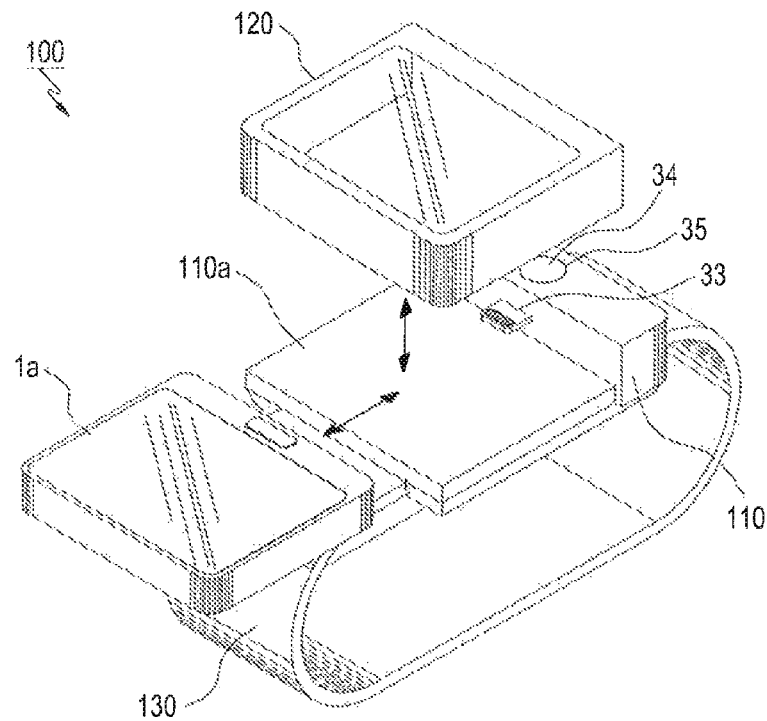
FIG. 16A is an exploded perspective view illustrating a protection case according to a third embodiment of the present disclosure.
Figure 16B:
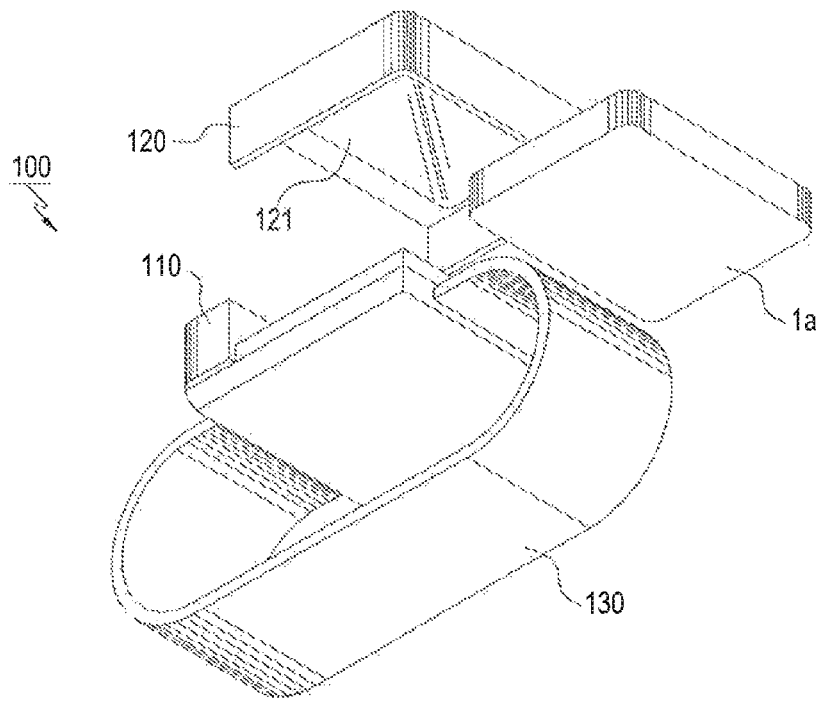
FIG. 16B is an exploded perspective view illustrating an accommodating part of the protection case according to the third embodiment of the present disclosure.
Figure 17:
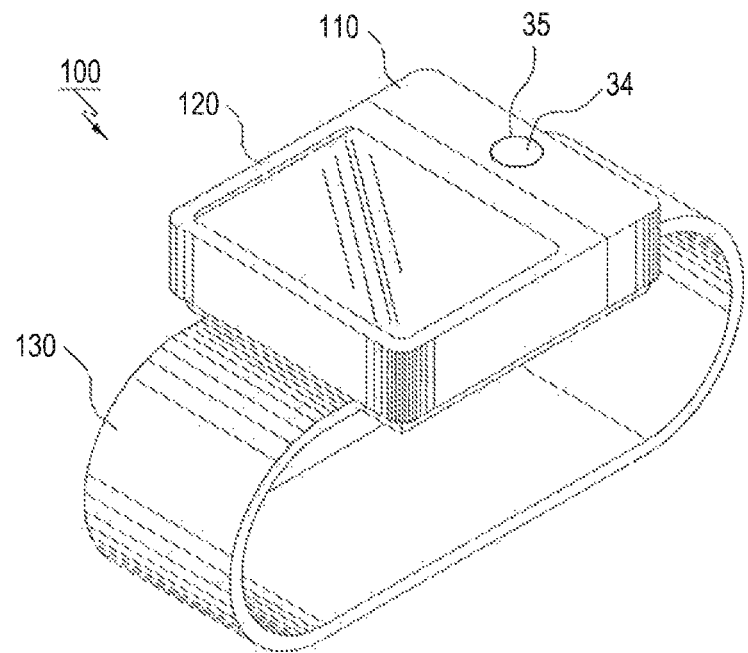
FIG. 17 is a perspective view illustrating a coupled state of the protection case according to the third embodiment of the present disclosure.
Figure 18:
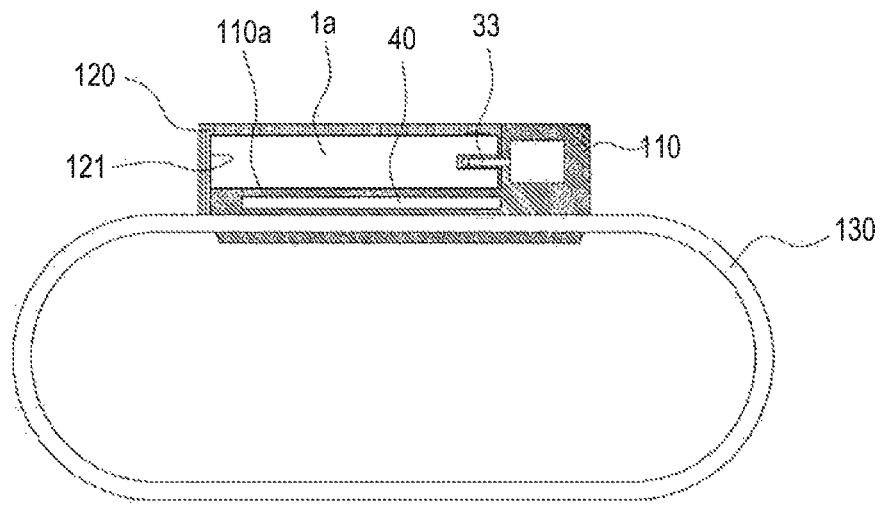
FIG. 18 is a side sectional view illustrating a coupled state of the protection case according to the third embodiment of the present disclosure.

FIG. 16 illustrates exploded perspective views illustrating a protection case according to a third embodiment of the present disclosure. FIG. 17 is a perspective view illustrating a coupled state of the protection case according to the third embodiment of the present disclosure. FIG. 18 is a side sectional view illustrating a coupled state of the protection case according to the third embodiment of the present disclosure.

Referring to FIGS. 16 to 18, the protection case 100 includes a case body in which an auxiliary battery cell 40 is embedded, a protection case 120, and a wearing part 130. The case body 110 may be electrically connected to the wearable electronic device 1a and supply electric power to the wearable electronic device 1a. That is, since a positioning part 110a for coupling the wearable electronic device 1a and positioning the wearable electronic device 1a at the same time is formed in the case body 110, the wearable electronic device 1a is positioned in the positioning part 110a and the connector 33 provided in the case body 110 is electrically connected to a terminal provided in the wearable electronic device 1a at the same time. Since the protection case 120 may be coupled to the case body 110 to cover the case body 110 or may be separated from the case body 110, the protection case 120 covers the case body 110 to be coupled to the case body 110 while the wearable electronic device 1a is positioned in the case body 110.

That is, since an accommodating recess 121 for accommodating the wearable electronic device 1a when the protection case 120 covers the case body to be coupled to the case body 110 coupled to the wearable electronic device 1a is formed in the protection case 120, the protection case 120 covers the case body 110 to be coupled to the case body 110 and the accommodating recess 121 accommodates the wearable electronic device 1a. Thus, the wearable electronic device 1a is accommodated in the accommodating recess 121 of the protection case 120, and the protection case 120 is coupled to the case body 110.

One end of the wearing part 130 is provided at one end of the case body 110, and an opposite end of the wearing part 130 is provided at an opposite end of the case body 110.

In this way, the protection case 120 covers an upper portion of the case body 110 electrically connected to the wearable electronic device 1a to be coupled to the case body 110, and the protection case 120 protects the wearable electronic device 1a.

Then, when the protection case 120 is separated from the case body 110, the protection case 120 is raised to an upper side of the case body 110 and is separated from the case body 110 at the same time. The wearable electronic device 1a is opened and the opened wearable electronic device 1a is separated and removed from the case body 110.

Thus, since the protection case 120 is coupled to the case body 110 while covering the case body 110 or is separated from the case body 110, the protection case 120 can be simply coupled to or separated from the case body 110.

Hereinafter, the case body 110 will be described in more detail with reference to FIGS. 17 and 18. The case 120 includes an auxiliary battery cell 40, a connector 33, a power switch 34, and one or more charging lamps 35. When the wearable electronic device 1a is coupled to the case body 110, the auxiliary battery cell 40 is provided in the case body 110 such that the auxiliary battery cell 40 electrically connects the connector 33 to a terminal provided in the wearable electronic device 1a and supplies charging power to the wearable electronic device 1a. The connector 33 is provided in the case body 110 to be electrically connected to the terminal provided in the wearable electronic device 1a. The power switch 34 is provided in the case body 110 to operate a battery level and a charging state of the auxiliary battery cell as the power switch 34 is pressed. The charging lamps 35 are provided at an outer circumference of the power switch to display the battery level and the charging state of the auxiliary battery cell 40.

Similarly, a method of charging the charging lamps has been described in the second embodiment of the present disclosure and will be omitted.

Hereinafter, a protection case of a wearable electronic device according to a fourth embodiment of the present disclosure will be described.

Figure 19:
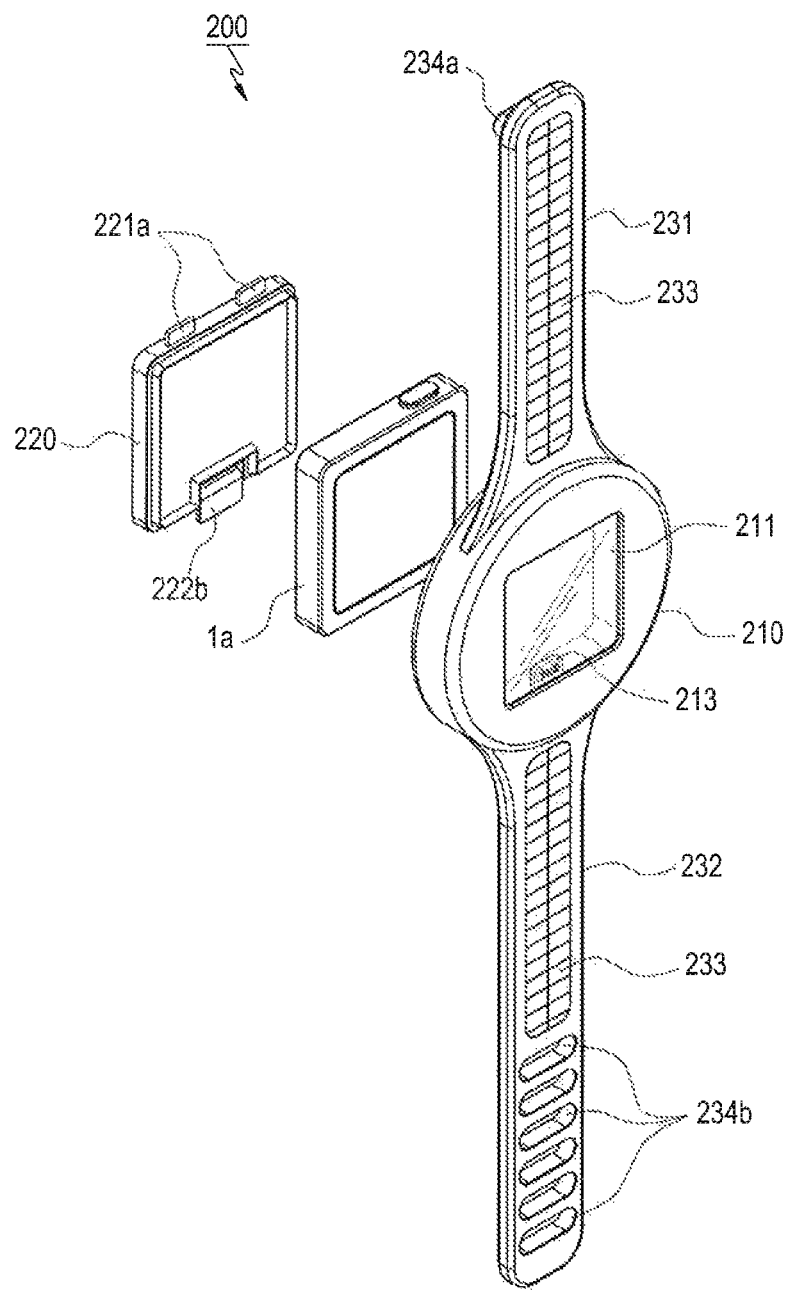
FIG. 19 is an exploded perspective view illustrating a front surface of a protection case according to a fourth embodiment of the present disclosure.
Figure 20:
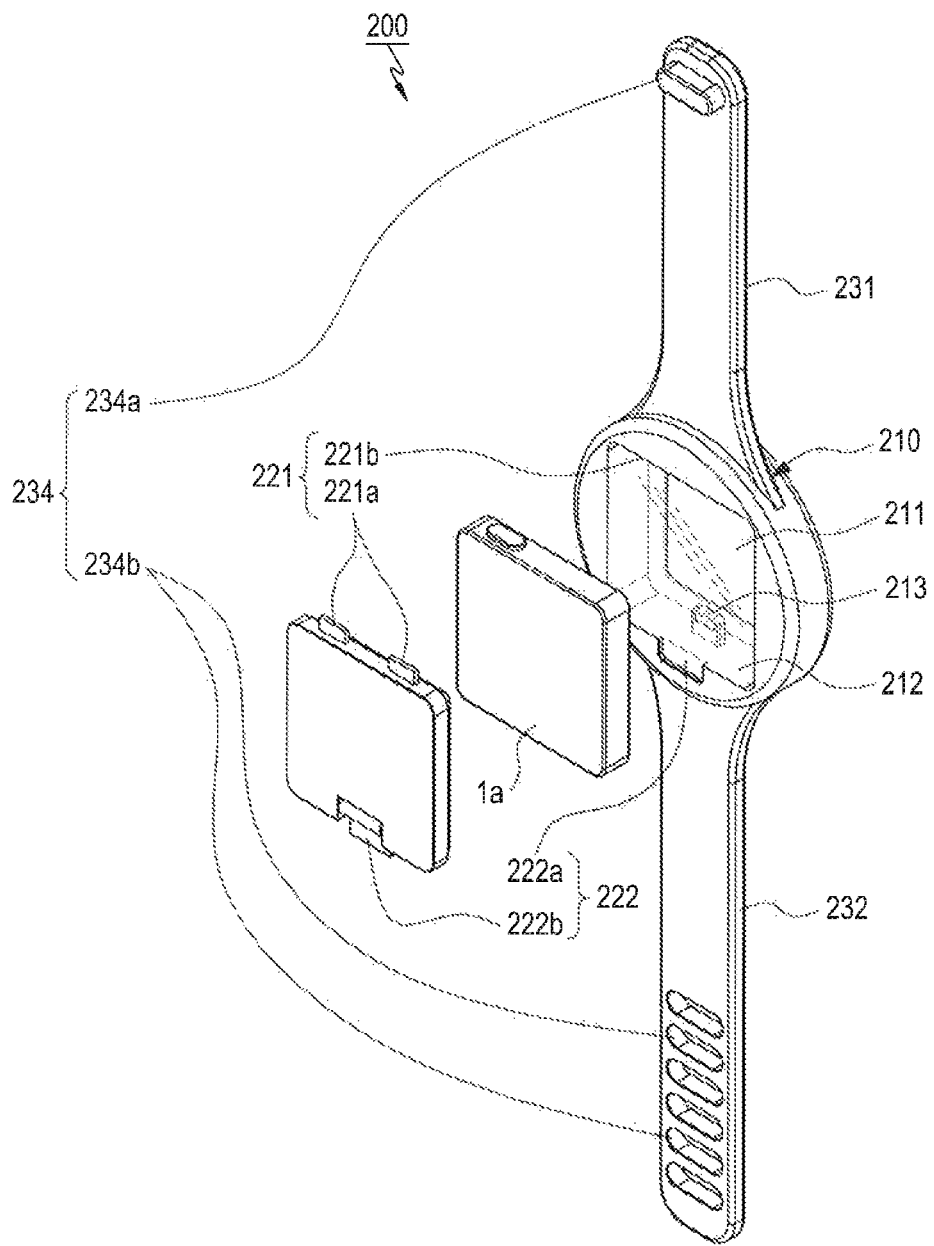
FIG. 20 is an exploded perspective view illustrating a rear surface of the protection case according to the fourth embodiment of the present disclosure.

FIG. 19 is an exploded perspective view illustrating a front surface of a protection case according to a fourth embodiment of the present disclosure. FIG. 20 is an exploded perspective view illustrating a rear surface of the protection case according to the fourth embodiment of the present disclosure.

First, referring to FIGS. 19 and 20, the protection case 200 for protecting and waterproofing the wearable electronic device 1a includes a protection case body 210, a cover 220, and wearing parts 230 including a solar cell module 233. A transparent cover 230 is provided on a front surface of the protection case body 210 and a rear surface of the protection case body 210 is opened so that the wearable electronic device 1a can be coupled to and electrically connected to the protection case body 210. The cover 220 is detachably coupled to a rear surface of the protection case body 210, and the wearable electronic device 1a may be coupled to or separated from the protection case body 210 by opening or closing the rear surface of the protection case body 210 as the cover 220 is attached to or detached from the rear surface of the protection case body 210. The wearing parts 230 are provided at opposite ends of the protection case body 210 so that electric power generated by the solar cell module 233 can be supplied to the wearable electronic device 1a.

Here, the solar cell module 233 is an apparatus for directly converting sunlight into electric power.

In this way, since the wearing parts 230 of the wearable electronic device 1a include a solar cell module 233 for generating electric power by using sunlight, electric power can be supplied to the wearable electronic device 1a without a basic battery pack or a separate auxiliary battery cell.

A mounting space 212 is formed within the protection case body 210 such that the wearable electronic device 1a can be mounted to the mounting space 212.

The protection case body 210 may include a connector 213 to be electrically connected to the wearable electronic device 1a.

The cover 220 may include first and second locking parts 221 and 222 for catching or releasing the cover 220 on a rear surface of the protection case body so that the rear surface of the protection case body 210 can be opened or closed. The first locking part 221 includes one or more locking bosses 221a and a locking/attaching portion 221b, and the locking bosses 221a are provided at a circumference of the cover 220 to be attached to or detached from the locking/attaching portion 221b so that the rear surface of the protection case body 210 is opened or closed by the cover 220. The locking/attaching portion 221b is provided on a rear surface of the protection case body 210 to be attached to or detached from the locking bosses 221a. The second locking part 222 includes a locker 222b to be inserted into a locking recess 222a formed on a rear surface of the protection case body 210 so as to be caught or released as the second locking part 222 is pressed.

The wearing part 230 includes first and second bands 231 and 232. The first band 231 is provided at one end of the protection case body 210, and the second band 232 is provided at an opposite end of the protection case body 210. The first and second bands 231 and 232 may include a band coupling part 234 to be coupled to or separated from each other.

The band coupling part 234 includes a coupling boss 234a, and one or more coupling recesses 234b. The coupling boss 234a is provided in the first band 231 to be coupled to or separated from the coupling recesses 234b so as to couple and separate to and from the first and second bands 231 and 232. The coupling recesses 234b are provided in the second band 232 to be coupled to or separated from the coupling boss.

Hereinafter, an operation process of the protection case according to the fourth embodiment of the present disclosure will be described.

Figure 21:
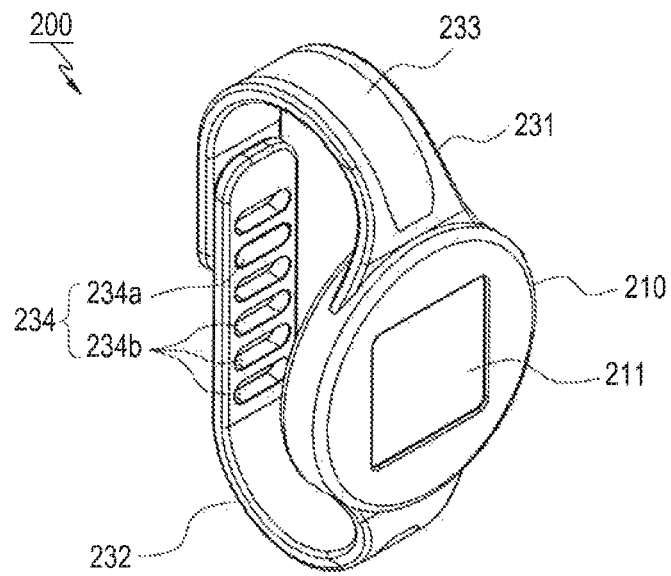
FIG. 21 is a perspective view illustrating an operation state of the front surface of the protection case according to the fourth embodiment of the present disclosure.
Figure 22:
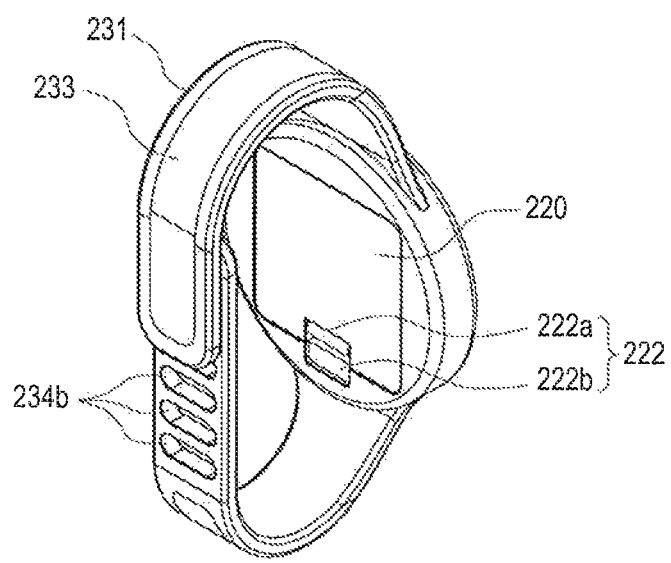
FIG. 22 is a perspective view illustrating an operation state of front and rear sides of the protection case according to the fourth embodiment of the present disclosure.

FIG. 21 is a perspective view illustrating an operation state of the front surface of the protection case according to the fourth embodiment of the present disclosure. FIG. 22 is a perspective view illustrating an operation state of front and rear sides of the protection case according to the fourth embodiment of the present disclosure.

First, as illustrated in FIGS. 19 and 20, the wearable electronic device 1a is coupled and mounted to a rear surface of the protection case body 210. Then, since the rear surface of the protection case body 210 is opened and the mounting space 233 is formed in the protection case body 210, the wearable electronic device 1a is mounted to the mounting space 233 and the connector 213 provided in the mounting space 233 is electrically connected to the terminal (not illustrated) provided in the wearable electronic device 1a.

In this state, the cover 220 is coupled to the rear surface of the protection case body 210 to close the rear surface of the protection case body 210. Since the first and second locking parts 221 and 222 that are caught by or released from the rear surface of the protection case body 210 are provided in the cover 220, the first locking part 221 is inserted into and caught by the rear surface of the protection case body 210 first, and the second locking part 222 provided at an opposite side of the cover 220 is inserted into the locking recess 222a formed on a rear surface of the protection case body 210 to be caught and fixed.

That is, since the first locking part 221 includes one or more locking bosses 221a and a locking/attaching portion 221b and the locking bosses 221a are provided at an upper portion of the cover 220, the locking boss 221a is inserted into and coupled to the locking/attaching portion 221b formed on the rear surface of the protection case body 210 when the cover 220 is coupled to the rear surface of the protection case body 210. In this state, the second locking portion 222 provided at a lower portion of the cover 220 is pushed into, caught by, and fixed to the locking recess 222a formed on the rear surface of the protection case body 210 and the cover 220 closes the opened rear surface of the protection case body 210.

In this state, in order to have the wearable electronic device 1a on the body of a user, the wearable electronic device 1a is put on the body of the user by using the wearing part 230 provided in the protection case body 210. That is, the wearable electronic device 1a is put on a wrist of the user.

Then, the wearing part 230 includes first and second bands 231 and 232. Since the first band 231 is provided at one end of the protection case body 210 and the second band 232 is provided at an opposite end of the protection case body 210, the first and second bands 231 and 232 enclose the wrist of the user and are coupled to each other by using the coupling part 234 provided in the first and second bands 231 and 232.

Since the coupling part 234 includes the coupling boss 234a of the first band 231, and one or more coupling recesses 234b provided in the second band 232, the coupling boss 234a of the first band 231 is coupled and fixed to the coupling recesses 234b of the second band 232.

The protection case 200 put on the wrist of the user is moved together with the user and the wearable electronic device 1a embedded in the protection case 200 is used at the same time. When the electric power of the battery pack (not illustrated) provided in the wearable electronic device 1a is exhausted, the solar cell module 233 provided in the wearing part 230 directly converts sunlight into electric power and the electric power is charged in the battery pack, so that the electric power charged in the battery pack (not illustrated) is supplied to the wearable electronic device 1a.

Thus, since electric power can be supplied to the wearable electronic device 1a by using the solar cell module 233, the electric power of the wearable electronic device 1a can be easily supplied without using a separate spare battery pack or an auxiliary battery cell, manufacturing costs of the product can be reduced, and the product can be miniaturized. Thus, use of the product can be further improved.

When the wearable electronic device 1a is separated from the protection case body 210, first, the coupling boss 234a of the first band 231 is separated from the coupling recesses 234b of the second band 232. The locker 222b provided at a lower portion of the cover 220 is pressed to be released from the locking recess 222a formed on the rear surface of the protection case body 210. Next, the locking boss 221a of the cover 220 is separated from the locking/attaching portion 221b of the protection case body 210.

Then, the cover 220 is opened at the same time when it is separated from the rear surface of the protection case body 210. The wearable electronic device 1a is separated from the opened rear surface of the protection case body 210.

Hereinafter, a protection case of a wearable electronic device according to a fifth embodiment of the present disclosure will be described.

Figure 23:
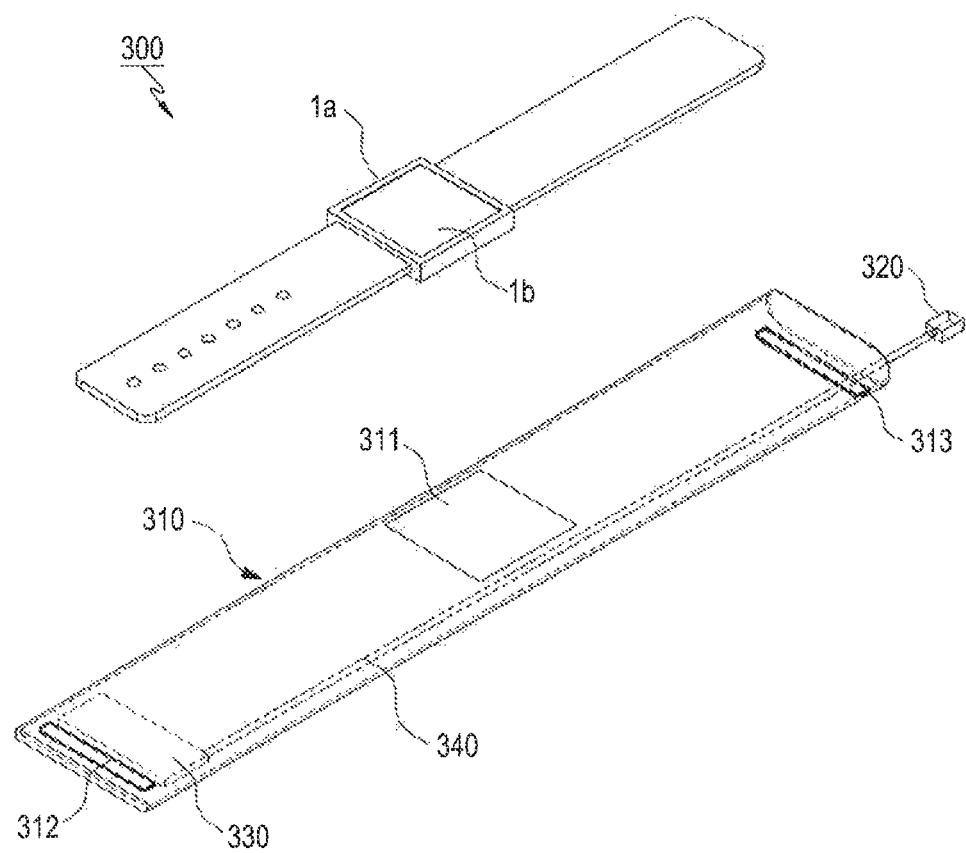
FIG. 23 is an exploded perspective view illustrating a configuration of a protection case according to a fifth embodiment of the present disclosure.
Figure 24:
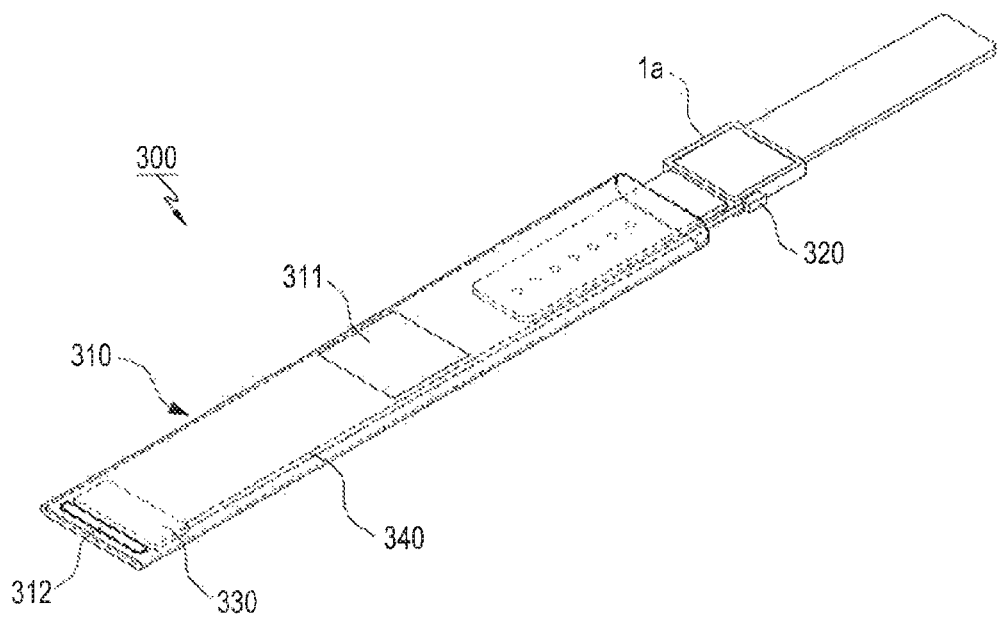
FIG. 24 is a perspective view illustrating an operation process of the protection case according to the fifth embodiment of the present disclosure.
Figure 25:
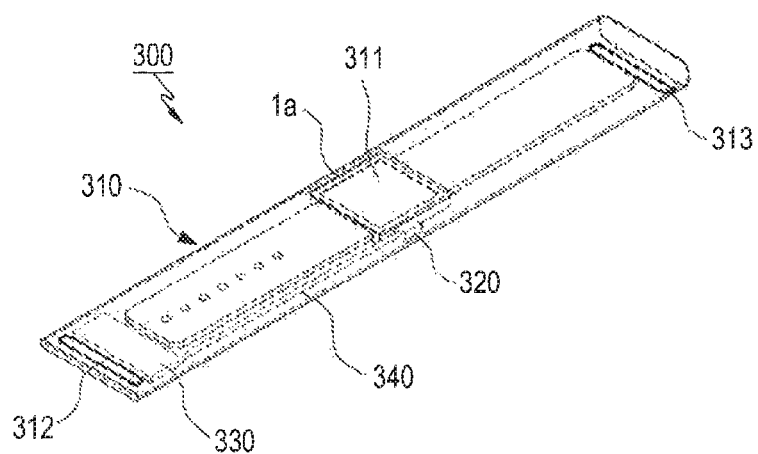
FIG. 25 is a perspective view illustrating a coupled state of the protection case according to the fifth embodiment of the present disclosure.

FIG. 23 is an exploded perspective view illustrating a configuration of a protection case according to a fifth embodiment of the present disclosure. FIG. 24 is a perspective view illustrating an operation process of the protection case according to the fifth embodiment of the present disclosure. FIG. 25 is a perspective view illustrating a coupled state of the protection case according to the fifth embodiment of the present disclosure.

Referring to FIGS. 23 to 25, the protection case 300 for protecting and waterproofing the wearable electronic device 1a includes a protection case housing 310 and a connector 320. The entire protection case housing 310 forms a soft band housing 310, and the entire wearable electronic device 1a may be inserted into the soft band housing 310. A solar cell module (not illustrated) is provided on a surface of the protection case housing 310 to supply electric power to the wearable electronic device 1a. The connector 320 is provided in the protection case housing 310 such that the connector 320 electrically connects the solar cell module and the wearable electronic device 1a and supplies the electric power of the solar cell module to the wearable electronic device 1a.

The solar cell module is an apparatus for directly converting sunlight into electric power.

In this way, since the protection case housing 310 includes a soft band housing 310 into which the entire wearable electronic device 1a is inserted, a deflection is generated in the entire protection case housing 310 due to the flexibility while the entire wearable electronic device 1a is inserted into the protection case housing 310, so that the wearable electronic device 1a can be put on the body of the user and the product can be worn in an improved way.

An opening part 311 of a transparent material may be provided in the protection case housing 310 to face the display 1b provided in the wearable electronic device 1a and display the display 1b to the outside.

A coupling part 312 may be provided at one end of the protection case housing 310 to be attached to or detached from the coupling boss 313 formed at an opposite end of the protection case housing 310.

An auxiliary battery cell 330 is provided in the protection case housing to receive electric power of the solar cell module to be charged and to supply the charged electric power to the wearable electronic device 1a.

A soft wire connector 340 may be provided in the protection case housing to electrically connect the connector 320 and the auxiliary battery cell 330. Although the soft wire connector 340 is exemplified in the embodiment of the present disclosure, the present disclosure is not limited thereto. That is, any soft connector 340 that can electrically connect the connector 320 and the auxiliary battery cell 330 may be applied to the present disclosure.

Hereinafter, an operation process of a protection case according to a fifth embodiment of the present disclosure will be described.

Figure 26:
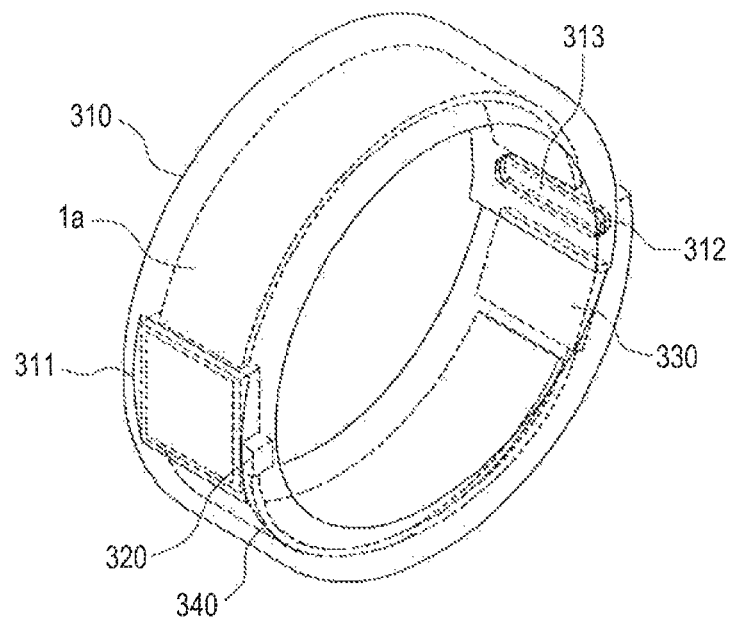
FIG. 26 is a perspective view illustrating an operation state of the protection case according to the fifth embodiment of the present disclosure.
Figure 27:
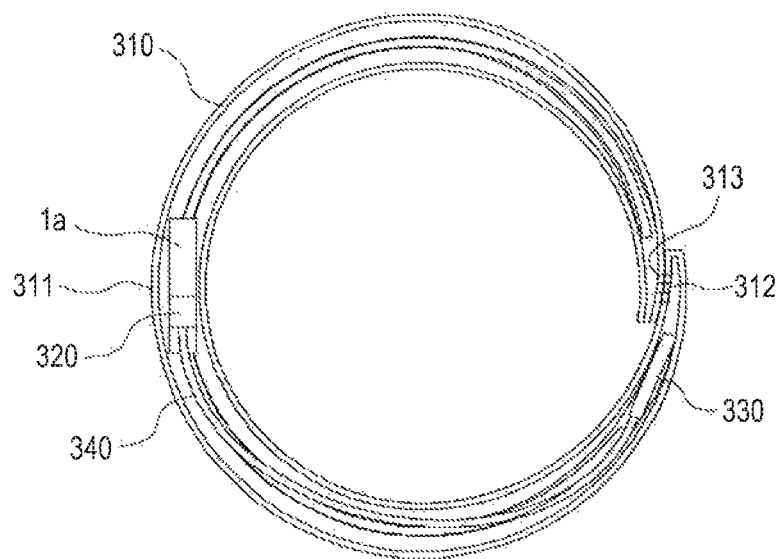
FIG. 27 is a side sectional view illustrating an operation state of the protection case according to the fifth embodiment of the present disclosure.

FIG. 26 is a perspective view illustrating an operation state of the protection case according to the fifth embodiment of the present disclosure. FIG. 27 is a side sectional view illustrating an operation state of the protection case according to the fifth embodiment of the present disclosure.

As illustrated in FIG. 23, the entire protection case housing 310 forms the soft band housing 310, and the entire wearable electronic device 1a is inserted into the band housing 310.

That is, since a mounting space is formed within the band housing 310, the entire wearable electronic device 1a is inserted into the mounting space.

Then, since the protection case housing 310 includes the connector 320, the auxiliary battery cell 330 embedded in the auxiliary case housing 310 and the wearable electronic device 1a are electrically connected to each other by using the connector 320. That is, since the soft wire connector 340 electrically connecting the connector 320 and the auxiliary battery cell 330 is provided in the protection case housing 310, the connector 320 is pulled by the soft wire connector 340 to be electrically connected to the terminal (not illustrated) provided in the wearable electronic device 1a. In this state, the entire wearable electronic device 1a is inserted into the protection case housing 310.

Then, since the protection case housing 310 includes the opening part 311 of a transparent material, the display 1b provided in the wearable electronic device 1a is located at the opening part 311 of a transparent material when the entire wearable electronic device 1a is inserted into the protection case housing so that the contents of the display 1b can be viewed from the outside.

In this state, the soft protection case housing 310 is deflected so that the protection case housing 310 can be put on the body of a user. That is, in order that the protection case housing 310 can be put on the body, that is, a wrist of the user, the protection case housing 310 is deflected and the coupling part 312 provided at one end of the protection case housing 310 is fitted with and coupled to the coupling boss 313 formed at an opposite end of the protection case housing 310.

As illustrated in FIGS. 26 and 27, the entire protection case housing 310 is deflected circularly. That is, the protection case housing 310 has a circular shape. Since the entire protection case housing 310 forms the soft band housing 310, the entire band housing 310 is deflected to have a circular shape.

The protection case housing 310 having a circular shape is put on the wrist of the user, in which state the protection case housing 310 is moved together with the user and the wearable electronic device 1a embedded in the protection case housing 310 is used. When the electric power of the battery pack (not illustrated) provided in the wearable electronic device 1a is exhausted, the solar cell module (not illustrated) provided on a surface of the protection case housing 310 directly converts sunlight into electric power and the electric power is charged in the auxiliary battery cell 330 provided in the protection case housing 310. The auxiliary battery cell 330 supplies the charged electric power to the wearable electric device 1a.

In this state, if the coupling part 312 provided at one end of the protection case housing 310 is separated from the coupling boss 313 again, the protection case housing 310 spreads out and returns to the original state. Then, the wearable electronic device 1a is extracted and removed from the protection housing 310.

Hereinafter, a protection case of a wearable electronic device according to a sixth embodiment of the present disclosure will be described.

Figure 28:
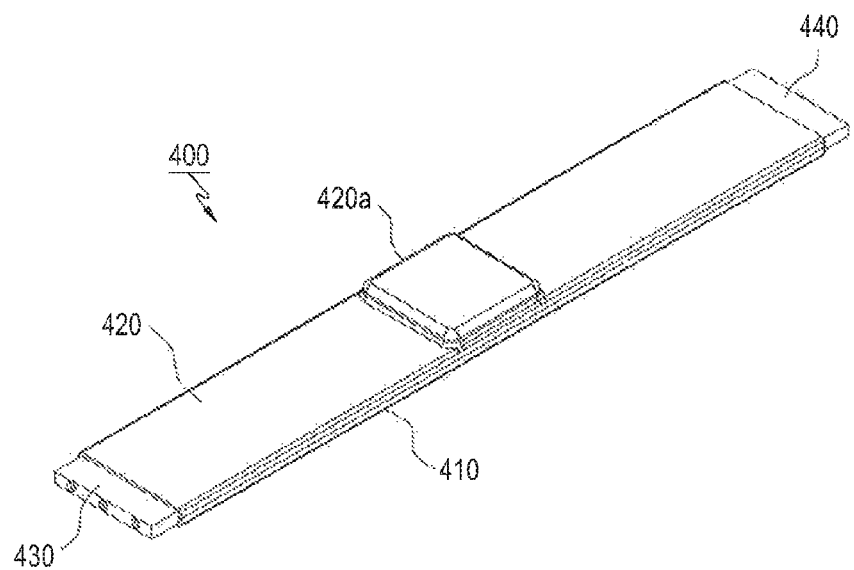
FIG. 28 is a perspective view illustrating a coupled state of a protection case according to a sixth embodiment of the present disclosure.
Figure 29:
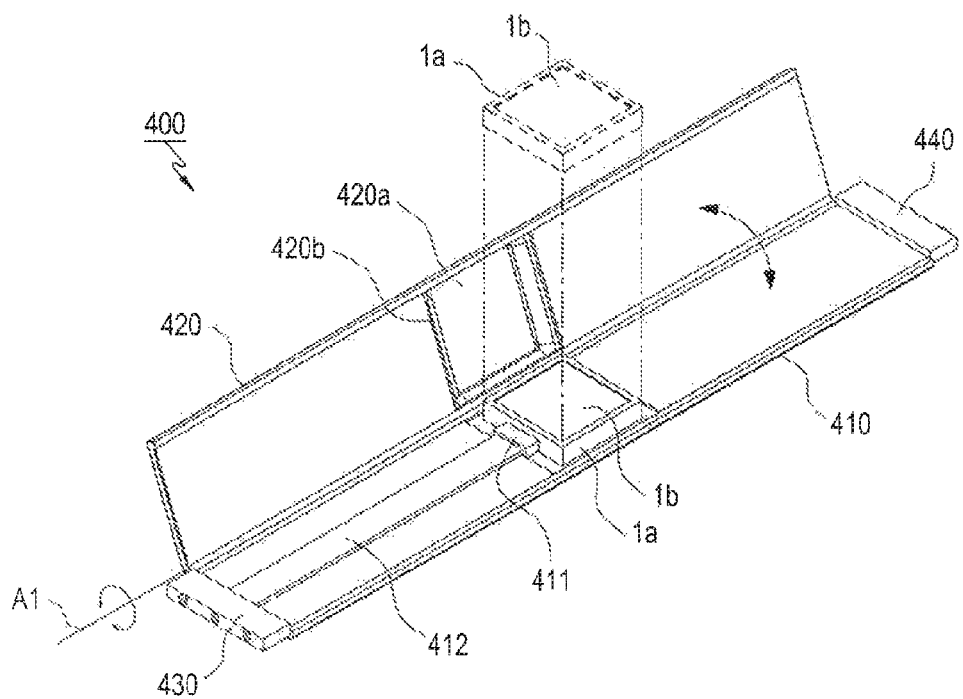
FIG. 29 is a perspective view illustrating an operation process of the protection case according to the sixth embodiment of the present disclosure.

FIG. 28 is a perspective view illustrating a coupled state of a protection case according to a sixth embodiment of the present disclosure. FIG. 29 is a perspective view illustrating an operation process of the protection case according to the sixth embodiment of the present disclosure.

Referring to FIGS. 28 and 29, the protection case 400 for protecting and waterproofing the wearable electronic device 1a includes a protection case part an entirety of which is soft, a soft rotatable case part 420, and first and second magnet coupling parts 430 and 440. The rotatable case part 420 is provided in the protection case part 410 to be rotated about a rotation axis. The first and second magnet coupling parts 430 and 440 may be provided at opposite ends of the protection case part 410 to attach or separate the opposite ends of the protection case part 410 by using a magnetic force.

Here, the first and second magnet coupling parts 430 and 440 are magnets, but the first and second magnet coupling parts 430 and 440 are not limited to magnets in the embodiment of the present disclosure. That is, any configuration that can attach or separate opposite ends of the protection case part 410 may be applied to the first and second magnet coupling parts 430 and 440 as a modified example.

The entireties of the protection case part 410 and the rotatable case part may be soft band cases. A solar cell module (not illustrated) is provided on a surface of the rotatable case part 420 to supply electric power to the wearable electronic device 1a. The solar cell module is an apparatus for directly converting sunlight into electric power.

In this way, the soft protection case 400 includes the protection case part and the rotatable case part 420, and the rotatable case part 420 may be opened and closed as the rotatable case part 420 is rotated with respect to the protection case part 410 and the wearable electronic device 1a may be mounted to the protection case 400. Accordingly, the wearable electronic device 1a can be simply and easily mounted to the protection case part 410. Further, since the first and second magnet coupling parts 430 and 440 to be attached or separated by a magnetic force are provided at opposite ends of the protection case part 410, opposite ends of the protection case part 410 can be simply coupled and separated. Accordingly, the protection case can be easily worn.

A cover part 420a of a transparent material may be provided in the rotatable case part 420 to face and position the display 1b provided in the wearable electronic device 1a and to display the display 1b to the outside.

The cover part 420a protrudes by a predetermined height, and a positioning recess 420b may be formed in the cover part 420a such that the wearable electronic device 1a can be positioned in the positioning recess 420b.

The first magnet coupling part 430 may be provided at one end of the protection case 410, and the second magnet coupling part 440 may be provided at an opposite end of the protection case 410. The first and second magnet coupling parts 430 and 440 may be attached to or separated from each other by a magnetic force by bending the protection case part 410 and the rotatable case part 420.

A connector 411 electrically connected to an auxiliary battery cell (not illustrated) charged by electric power generated by the solar cell module (not illustrated) to supply the electric power of the auxiliary battery cell (not illustrated) to the wearable electronic device 1a is provided in the protection case part 410.

An auxiliary battery cell (not illustrated) may be provided in the protection case part 410 to receive the electric power of the solar cell module and supply the charged electric power to the wearable electronic device 1a.

A soft connector 412 may be provided in the protection case 410 to electrically connect the connector 411 and the auxiliary battery cell (not illustrated). Although the soft connector 412 has been exemplified in the embodiment of the present disclosure, the present disclosure is not limited thereto. That is, another soft connector 412 that can electrically connect the connector 411 and the auxiliary battery cell also may be applied.

Hereinafter, an operation process of a protection case according to a sixth embodiment of the present disclosure will be described.

Figure 30:
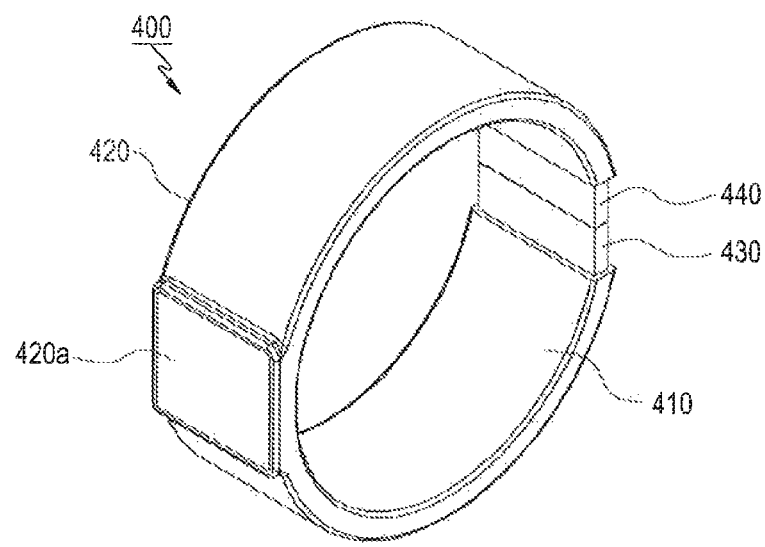
FIG. 30 is a perspective view illustrating an operation state of the protection case according to the sixth embodiment of the present disclosure.
Figure 31:
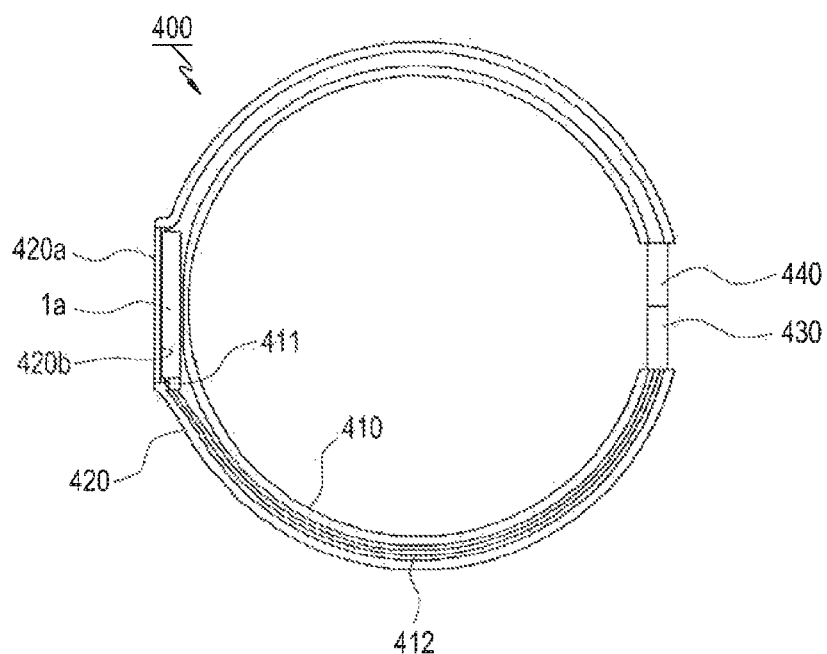
FIG. 31 is a side sectional view illustrating an operation state of the protection case according to the sixth embodiment of the present disclosure.

FIG. 30 is a perspective view illustrating an operation state of the protection case according to the sixth embodiment of the present disclosure. FIG. 31 is a side sectional view illustrating an operation state of the protection case according to the sixth embodiment of the present disclosure.

As illustrated in FIG. 29, the protection case 400 includes a protection case part 410 an entirety of which is soft, a soft rotatable case part 420, and first and second magnet coupling parts 430 and 440. The rotatable case part 420 is coupled to the protection case part 410 to be rotated about a hinge axis A1.

In this state, the rotatable case part 420 is rotated about the hinge axis A1 from the protection case part 410 to be opened. That is, the rotatable case part is rotated about the hinge axis provided at one side of the protection case part to open the protection case part 410.

The wearable electronic device 1a is mounted to the opened protection case part 410, and the connector 411 provided in the protection case part 410 is electrically connected to a terminal (not shown) provided in the wearable electronic device 1a.

The protection case part 410 is closed by rotating the rotatable case part about the hinge axis A1 again. Then, the cover part 420a of a transparent material formed in the rotatable case part 420 faces the display provided in the wearable electronic device 1a and the cover part 420a of a transparent material displays contents of the display to the outside. A positioning recess 420b is formed in the cover part 420a, and the wearable electronic device 1a is coupled to and positioned in the positioning recess 420b when the rotatable case part 420 is closed.

As illustrated in FIGS. 30 and 31, the entireties of the protection case part and the rotatable case part 420 are deflected to be circular, and the first and second magnet coupling parts 430 and 440 formed at opposite ends of the protection case part 410 get close to each other to be attached to each other by a magnetic force. That is, if the first and second magnet coupling parts 430 and of the protection case part 410 are attached to each other by a magnetic force, the protection case part 410 and the rotatable case part 420 form a circular shape.

The protection case part 410 and the rotatable case part 420 that are circular are put on a wrist of a user, in which state they are moved together with the user and the wearable electronic device 1a embedded in the transparent cover part 420a of the rotatable case part 420 is used at the same time. When electric power of the battery pack (not illustrated) provided in the wearable electronic device 1a is exhausted, the solar cell module provided on a surface of the rotatable case part 420 directly converts sunlight into electric power and the converted electric power is charged in the auxiliary battery cell (not shown) provided in the protection case part 410 at the same time. The auxiliary battery cell supplies the charged electric power to the wearable electronic device 1a.

In this state, if the first and second magnet coupling parts 430 and 440 provided at opposite ends of the protection case part 410 are separated from each other again, the protection case part 410 and the rotatable case part 420 spread out and return to an original state. Then, the rotatable case part 420 is rotated about the hinge axis A1 again to open the protection case part 410, and the wearable electronic device 1a is extracted to be removed.

It is apparent to those skilled in the art to which the present disclosure pertains that the protection case for protecting a wearable electronic device according to the present disclosure is not limited to the embodiments and the drawings but various replacements, modifications, and changes can be made without departing from the technical spirit of the present disclosure.

What is claimed is:

1. A protection case for protecting a smart watch device, the protection case comprising:

a protection case body that comprises a first case and a second case that are waterproof, wherein the second case comprises a removable auxiliary battery cell disposed within the second case configured to be electrically connected to the smart watch device and supplies electric power to the smart watch device; and a plurality of coupling parts that are provided in the first and second case, wherein the coupling parts are configured to couple the first and second cases to each other and configured to couple the smart watch device to the first and second case while enclosing the smart watch device when the coupling parts are coupled to each other, wherein the coupling parts are configured to separate the first and second cases from each other and separate the smart watch device from the first and second case when the coupling parts are separated from each other.

2. The protection case of claim 1, wherein the second case comprises:

a charging terminal penetrating part that passes through an external charging terminal to be electrically connected to the auxiliary battery cell; and first and second power terminals that are electrically connected to a connection terminal provided in the smart watch device.

3. The protection case of claim 2, wherein the first power terminal comprises one or more power connection terminals to be electrically connected to the connection terminal when the smart watch device is coupled to the second case, and the second power terminal comprises a connector to be electrically connected to a power connector provided in the smart watch device when the wearable electronic device is coupled to the second case.

4. The protection case of claim 1, wherein a case waterproof member inserted into a waterproof recess formed in the second case is provided in the first case.

5. The protection case of claim 1, wherein the coupling parts comprises first and second coupling parts, the first coupling part comprises:
one or more coupling recesses that are provided at an inner circumference of the first case; and
one or more coupling hooks that are provided at an inner circumference of the second case and attached to or detached from the coupling recesses, and the second coupling part comprises:
stopping portions that are provided at opposite ends of the first case; and
catching portions that are provided at opposite ends of the second case and attached to or detached from the stopping portions.

6. The protection case of claim 5, wherein the second coupling part is separated from or coupled to a band provided in the smart watch device.

7. The protection case of claim 5, wherein a band waterproof member is provided in the second coupling part to waterproof a band provided in the wearable electronic device.

8. The protection case of claim 1, wherein the smart watch device is a watch type portable terminal.

9. The protection case of claim 7, wherein the smart watch device is coupled to an upper surface of the second case, the first case is coupled to an upper portion of the second case coupled to the smart watch device, the first and second power terminals provided in the second case are electrically connected to a connector terminal provided in the smart watch device, the first and second coupling parts provided at opposite ends of the protection case body are coupled and fixed to each other, the band waterproof member provided in the first and second coupling parts is coupled to a band to waterproof the band, and the case waterproof member provided in the first case is inserted into the waterproof recess formed in the second case while waterproofing the protection case body.

* * * * *